(12) United States Patent
El Batawi et al.

(10) Patent No.: US 10,784,521 B2
(45) Date of Patent: Sep. 22, 2020

(54) MULTI-LAYERED COATING PROVIDING CORROSION RESISTANCE TO ZIRCONIA BASED ELECTROLYTES

(71) Applicant: BLOOM ENERGY CORPORATION, Sunnyvale, CA (US)

(72) Inventors: Emad El Batawi, Sunnyvale, CA (US); Eric Petersen, San Jose, CA (US); Mina Touma, Sunnyvale, CA (US); Richard Stephenson, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 1241 days.

(21) Appl. No.: 14/476,963

(22) Filed: Sep. 4, 2014

(65) Prior Publication Data

US 2014/0377680 A1     Dec. 25, 2014

Related U.S. Application Data

(62) Division of application No. 13/677,836, filed on Nov. 15, 2012, now Pat. No. 8,852,825.
(Continued)

(51) Int. Cl.
*H01M 8/2485* (2016.01)
*H01M 8/1253* (2016.01)
(Continued)

(52) U.S. Cl.
CPC ....... *H01M 8/0215* (2013.01); *H01M 8/0217* (2013.01); *H01M 8/0228* (2013.01);
(Continued)

(58) Field of Classification Search
CPC .......... H01M 8/04201; H01M 8/2485; H01M 8/1253; H01M 8/0215; H01M 8/0217;
(Continued)

(56) References Cited

U.S. PATENT DOCUMENTS

| 4,135,041 A | 1/1979 | Jung et al. |
| 4,755,429 A | 7/1988 | Nickols et al. |

(Continued)

FOREIGN PATENT DOCUMENTS

| CN | 101682043 A | 3/2010 |
| EP | 0615299 A1 | 9/1994 |

(Continued)

OTHER PUBLICATIONS

Cao et al., "Ceramic materials for thermal barrier coatings", Mar. 7, 2003, Journal of the European Ceramic Society, pp. 1-10.*
(Continued)

*Primary Examiner* — Milton I Cano
*Assistant Examiner* — Kiran Akhtar
(74) *Attorney, Agent, or Firm* — The Marbury Law Group PLLC

(57) ABSTRACT

A solid oxide fuel cell (SOFC) stack including a plurality of SOFCs and a plurality of interconnects. Each interconnect is located between two adjacent SOFCs, and each interconnect contains a Mn or Co containing, electrically conductive metal oxide layer on an air side of the interconnect. The SOFC stack also includes a barrier layer located between the electrically conductive metal oxide layer and an adjacent SOFC. The barrier layer is configured to prevent Mn or Co diffusion from the electrically conductive metal oxide layer to the adjacent SOFC.

13 Claims, 20 Drawing Sheets

Related U.S. Application Data

(60) Provisional application No. 61/560,893, filed on Nov. 17, 2011.

(51) Int. Cl.

| | | |
|---|---|---|
| *H01M 8/0215* | (2016.01) | |
| *H01M 8/0217* | (2016.01) | |
| *H01M 8/0228* | (2016.01) | |
| *H01M 8/0282* | (2016.01) | |
| *H01M 8/2404* | (2016.01) | |
| *H01M 8/2457* | (2016.01) | |
| *H01M 8/2432* | (2016.01) | |
| *H01M 8/2483* | (2016.01) | |
| *H01M 8/2425* | (2016.01) | |
| *H01M 8/124* | (2016.01) | |
| *H01M 2/16* | (2006.01) | |
| *H01M 2/14* | (2006.01) | |
| *H01M 8/04082* | (2016.01) | |

(52) U.S. Cl.
CPC ....... *H01M 8/1253* (2013.01); *H01M 8/2404* (2016.02); *H01M 8/2432* (2016.02); *H01M 8/2457* (2016.02); *H01M 8/2483* (2016.02); *H01M 2/14* (2013.01); *H01M 2/16* (2013.01); *H01M 8/0282* (2013.01); *H01M 8/04201* (2013.01); *H01M 8/2425* (2013.01); *H01M 8/2485* (2013.01); *H01M 2008/1293* (2013.01); *H01M 2300/0077* (2013.01)

(58) Field of Classification Search
CPC .... H01M 8/0228; H01M 8/00; H01M 8/0282; H01M 2/16; H01M 2/14; H01M 8/2404; H01M 8/2457; H01M 8/2432; H01M 8/2483; H01M 8/2425
See application file for complete search history.

(56) References Cited

U.S. PATENT DOCUMENTS

| | | | |
|---|---|---|---|
| 4,913,982 | A | 4/1990 | Kotchick et al. |
| 5,162,167 | A | 11/1992 | Minh et al. |
| 5,213,910 | A | 5/1993 | Yamada |
| 5,215,946 | A | 6/1993 | Minh |
| 5,248,712 | A | 9/1993 | Takeuchi et al. |
| 5,256,499 | A | 10/1993 | Minh et al. |
| 5,273,837 | A | 12/1993 | Aiken et al. |
| 5,290,642 | A | 3/1994 | Minh et al. |
| 5,342,705 | A | 8/1994 | Minh et al. |
| 5,368,667 | A | 11/1994 | Minh et al. |
| 5,382,315 | A | 1/1995 | Kumar |
| 5,385,792 | A | 1/1995 | Shiratori et al. |
| 5,453,331 | A | 9/1995 | Bloom et al. |
| 5,494,700 | A | 2/1996 | Anderson et al. |
| 5,501,914 | A | 3/1996 | Satake et al. |
| 5,518,829 | A | 5/1996 | Satake et al. |
| 5,589,017 | A | 12/1996 | Minh |
| 5,641,585 | A | 6/1997 | Lessing et al. |
| 5,702,837 | A * | 12/1997 | Xue .................... H01M 4/9066 429/465 |
| 5,733,499 | A | 3/1998 | Takeuchi et al. |
| 5,955,392 | A | 9/1999 | Takeuchi et al. |
| 6,001,761 | A | 12/1999 | Hata et al. |
| 6,361,892 | B1 | 3/2002 | Ruhl et al. |
| 6,492,053 | B1 | 12/2002 | Donelson et al. |
| 6,582,845 | B2 | 6/2003 | Helfinstine et al. |
| 6,589,681 | B1 | 7/2003 | Yamanis |
| 6,638,575 | B1 | 10/2003 | Chen et al. |
| 6,835,488 | B2 | 12/2004 | Sasahara et al. |
| 7,045,237 | B2 | 5/2006 | Sridhar et al. |
| 8,852,825 | B2 | 10/2014 | El Batawi et al. |
| 2002/0012825 | A1 | 1/2002 | Sasahara et al. |
| 2002/0132156 | A1 | 9/2002 | Ruhl et al. |
| 2003/0170527 | A1 | 9/2003 | Finn et al. |
| 2003/0180602 | A1 | 9/2003 | Finn |
| 2004/0101742 | A1 | 5/2004 | Simpkins et al. |
| 2004/0200187 | A1 | 10/2004 | Warrier et al. |
| 2005/0017055 | A1 | 1/2005 | Kurz et al. |
| 2005/0136312 | A1 | 6/2005 | Bourgeois et al. |
| 2005/0227134 | A1 | 10/2005 | Nguyen |
| 2007/0037031 | A1 * | 2/2007 | Cassidy .................. C22C 29/12 429/457 |
| 2007/0134532 | A1 | 6/2007 | Jacobson et al. |
| 2007/0231676 | A1 | 10/2007 | Cassidy et al. |
| 2008/0081223 | A1 | 4/2008 | Yasumoto et al. |
| 2008/0085439 | A1 | 4/2008 | Hilliard |
| 2008/0193825 | A1 * | 8/2008 | Nguyen ................ H01M 8/242 429/458 |
| 2010/0055533 | A1 | 3/2010 | Kebbede et al. |
| 2010/0119917 | A1 | 5/2010 | Kumar et al. |
| 2010/0159344 | A1 * | 6/2010 | Gottmann ........... H01M 8/0276 429/469 |
| 2010/0239937 | A1 | 9/2010 | Janousek et al. |
| 2011/0200909 | A1 * | 8/2011 | Parihar ............... C03C 10/0036 429/469 |
| 2013/0130146 | A1 | 5/2013 | Batawi et al. |
| 2014/0342267 | A1 * | 11/2014 | Parihar ............... H01M 8/2425 429/465 |

FOREIGN PATENT DOCUMENTS

| | | |
|---|---|---|
| EP | 1850412 A1 | 10/2007 |
| EP | 1950824 A1 | 7/2008 |
| JP | 06-215778 | 8/1994 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2009004297 A | 8/2009 |
| JP | 2009-212046 | 9/2009 |
| JP | 2009212046 A | 9/2009 |
| JP | 2009293106 A | 12/2009 |
| JP | 2010062145 A | 3/2010 |
| TW | 201042810 A | 12/2010 |
| WO | WO2006/016628 A1 | 2/2006 |
| WO | WO2010061585 A1 | 6/2010 |
| WO | WO2010108057 A2 | 9/2010 |
| WO | WO2013074746 A1 | 5/2013 |

OTHER PUBLICATIONS

First Office Action of Taiwanese Patent Application No. 101138786, dated Apr. 12, 2016, 4 pages.
Search Report for Taiwanese Patent Application No. 101138786, completed Apr. 1, 2016, 2 pages.
Japanese Office Communication, Notification of Reasons for Refusal for JP Patent Application No. JP 2014-542450, dated Jun. 21, 2016, 11 pages.
State Intellectual Property Office of P.R.C. Notice of Allowance of Patent and Search Report for P.R.C. (China) Patent Application No. 201280056866.3, dated Sep. 7, 2016, 4 pages.
Japanese Notification of Reasons for Refusal for Japanese Patent Application No. 2014-542450, dispatch date Jan. 17, 2017, 7 pages.
First Office Action of Chinese Patent Application No. 201280056866.3, dated Nov. 2, 2015, with English Language Translation, (11 pages).
Choi, J. P. et al., "Development of MnGoO Coating with New Aluminizing Process for Planar SOFC Stacks," International Journal of Hydrogen Energy, vol. 36, pp. 4549-4556, (2011).
Piccardo, P. et al., "Interconnect Materials for Next-Generation Solid Oxide Fuel Cells," J. Appl. Electrochem., vol. 39, pp. 545-551, (2009).
European Office Communication and Supplementary EP Search Report for EP Application No. EP12849352.5, dated Jun. 1, 2015 (8 Sheets).
European Office Communication Rules 70(2) and 70a(2) for EP Application No. EP12849352.5, dated Jun. 18, 2015 (1 Sheet).

(56) References Cited

OTHER PUBLICATIONS

Haynes International High-Temperature Alloys, "HAYNES (Reg.) 214 (TM) alloy", 1996, pp. 1-19.
Haynes International High-Temperature Alloys, "HAYNES (Reg.) 230(TM) alloy", 2004, pp. 1-27.
International Search Report & Written Opinion, International Application No. PCT/US2007/08224, dated Nov. 26, 2008, 10 pgs.
International Search Report, International Application No. PCT/US2003/04808, dated Aug. 19, 2003, 9pgs.
Supplementary European Search Report, International Application No. PCT/US2003/04808, dated Jun. 2, 2008, 3pgs.
International Search Report & Written Opinion, International Application No. PCT/US2010/027899, dated Oct. 20, 2010, 11pgs.
International Preliminary Report on Patentability, International Application No. PCT/US2010/027899, dated Sep. 20, 2011, 6pgs.
International Search Report and Written Opinion, International Application No. PCT/US2012/065213, dated Mar. 29, 2013.

* cited by examiner

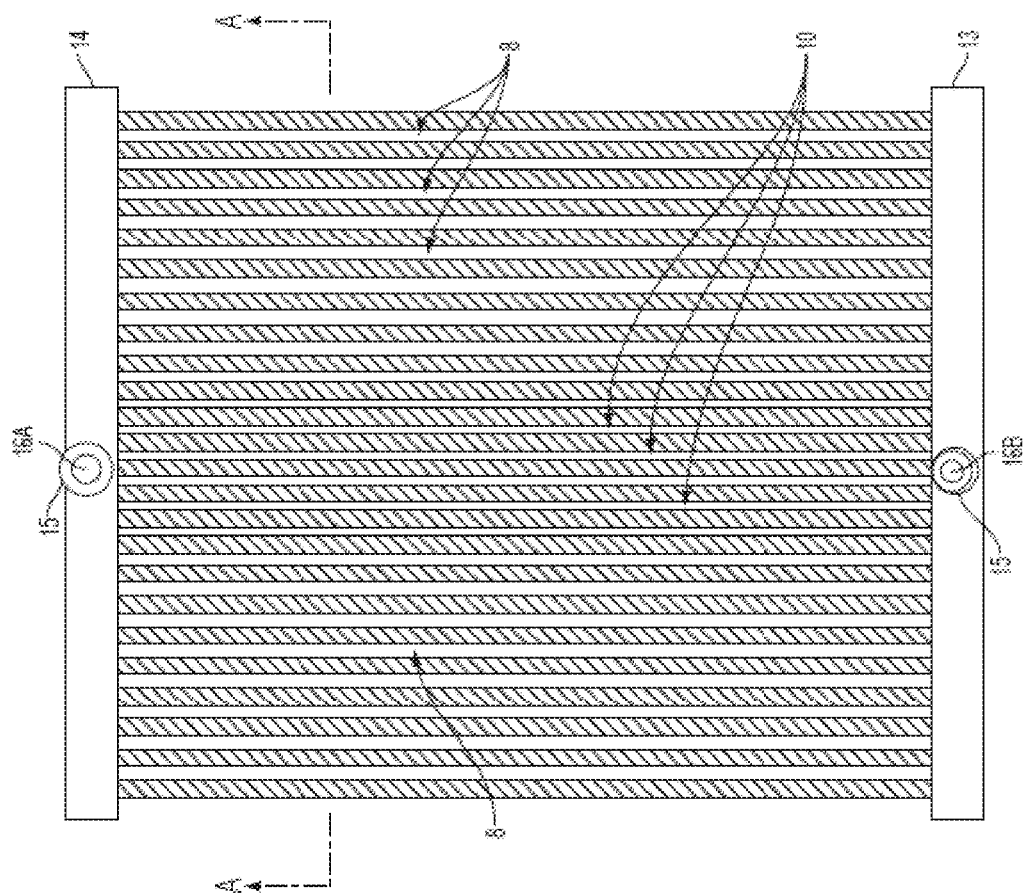

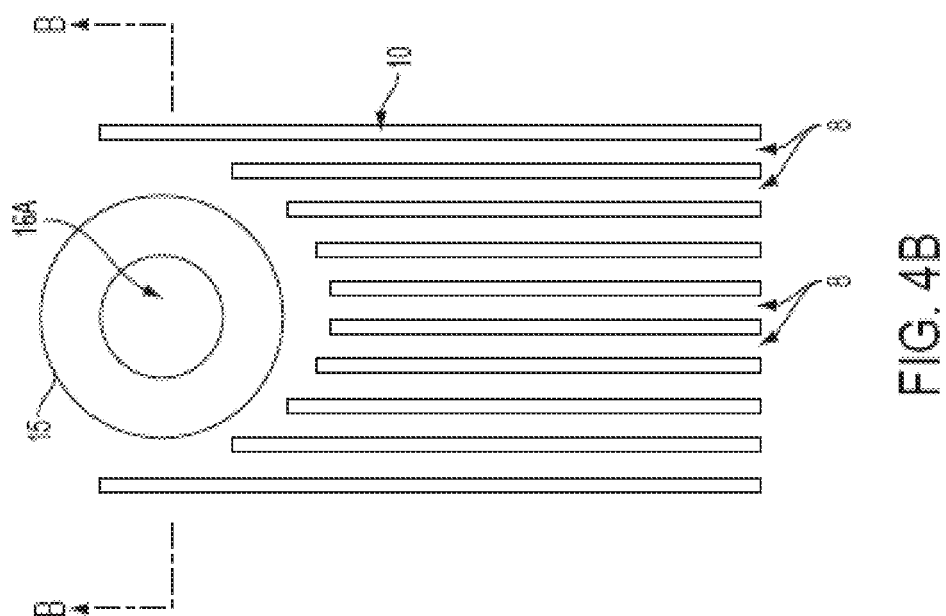

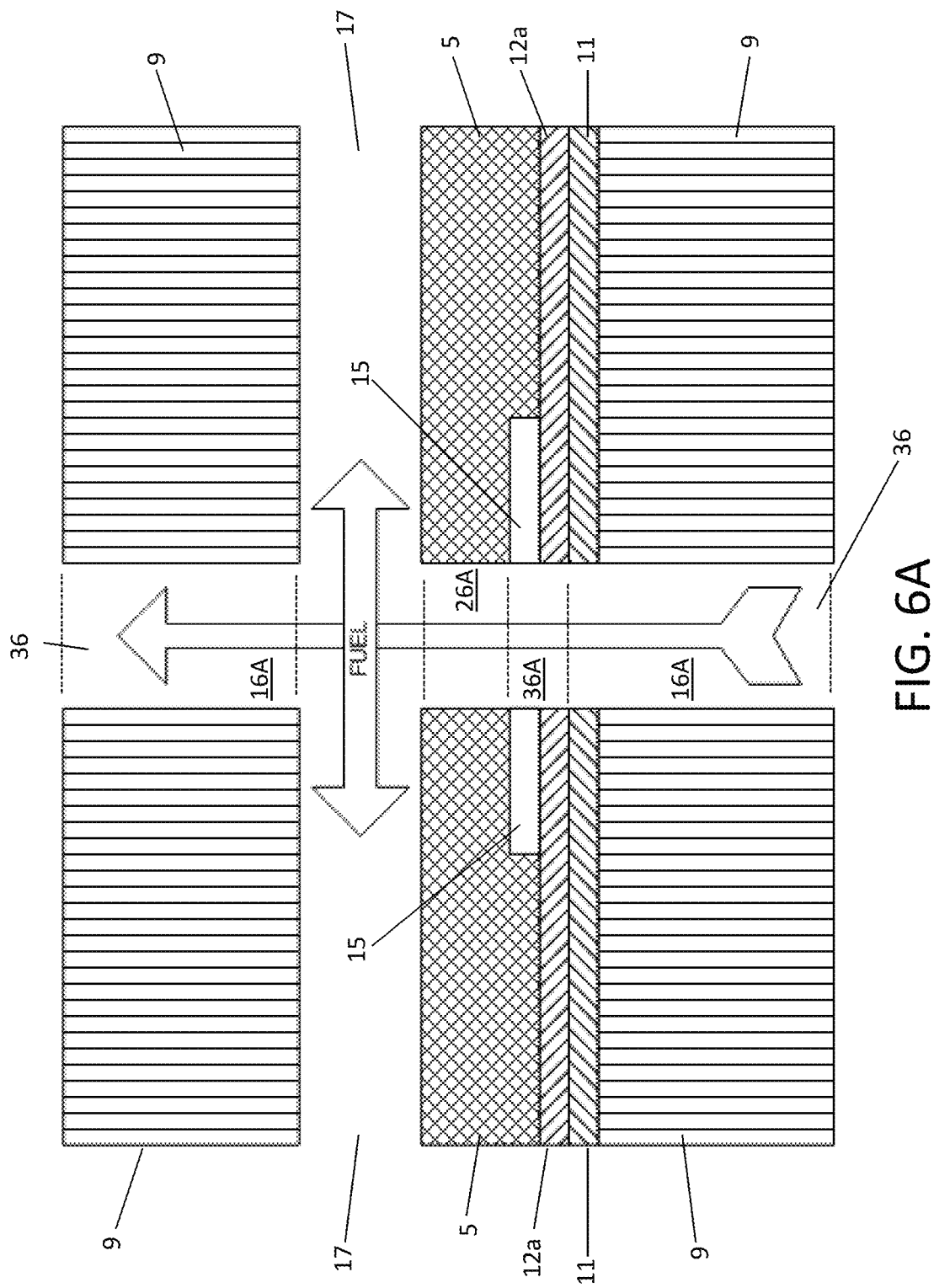

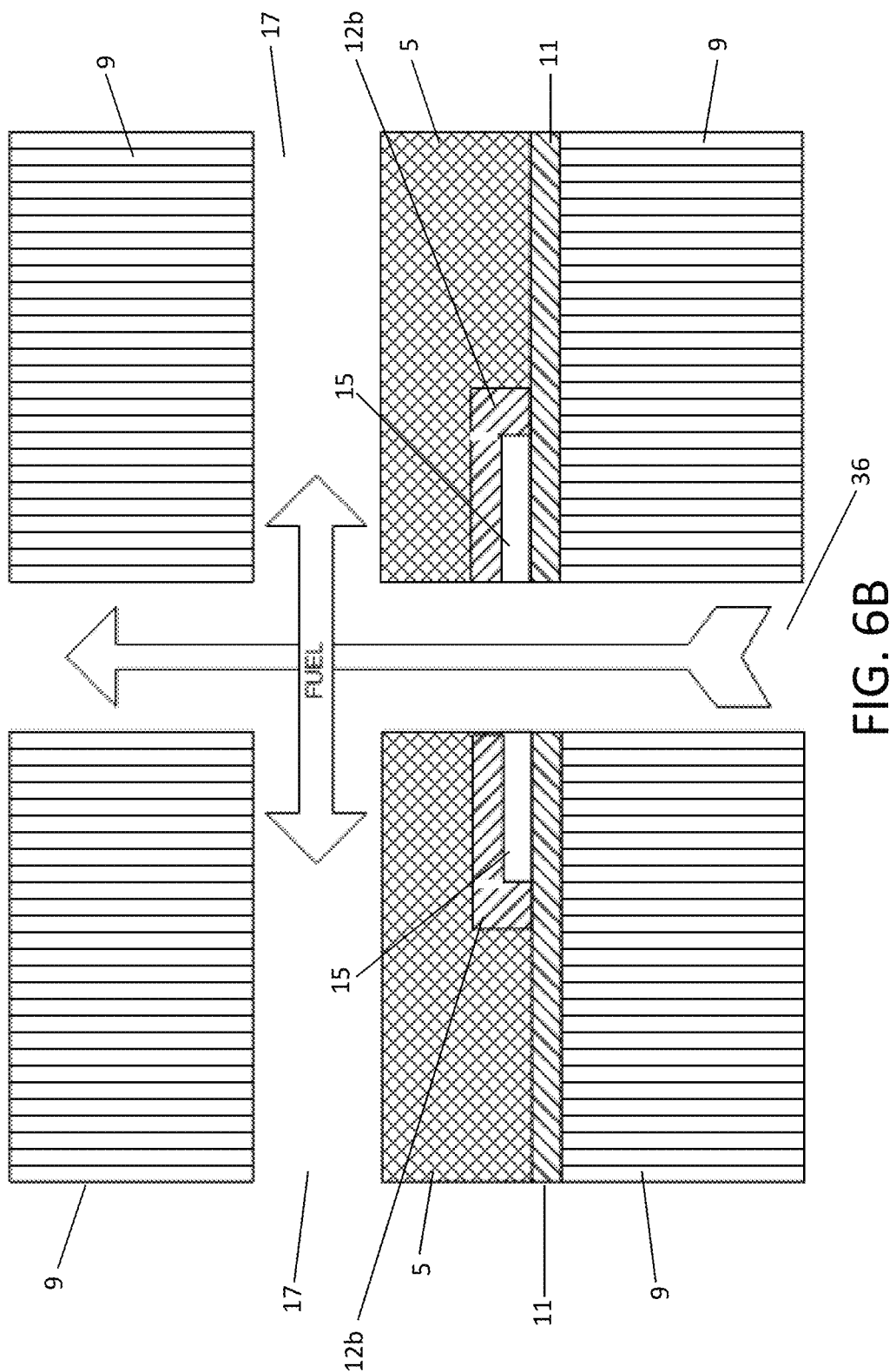

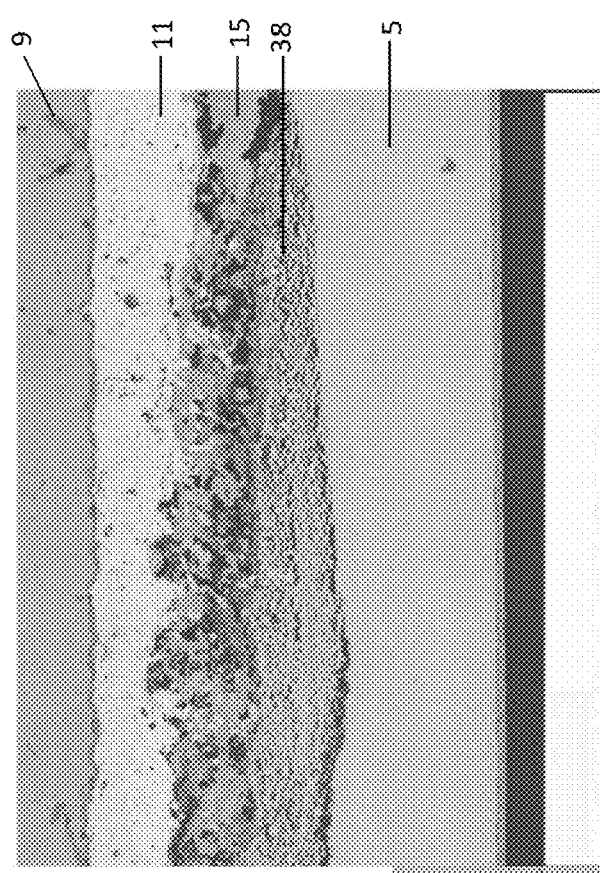
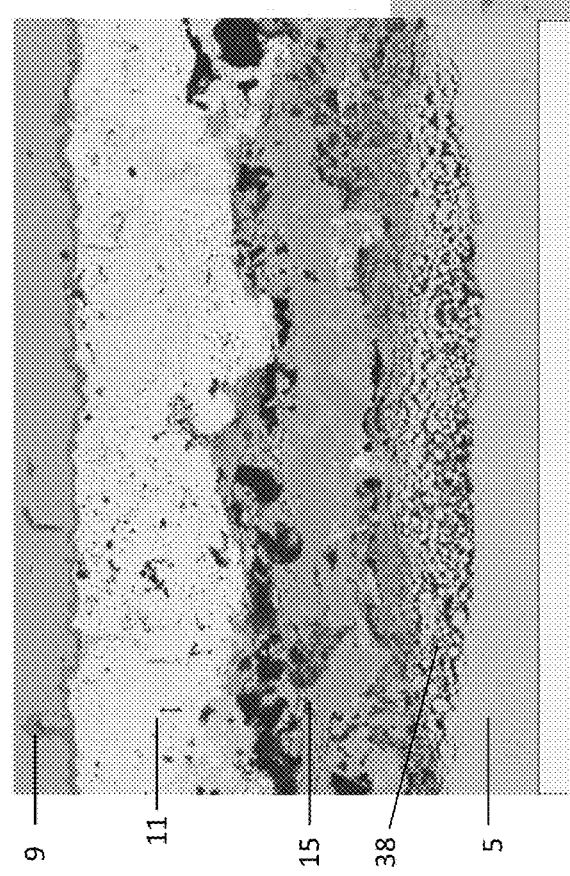
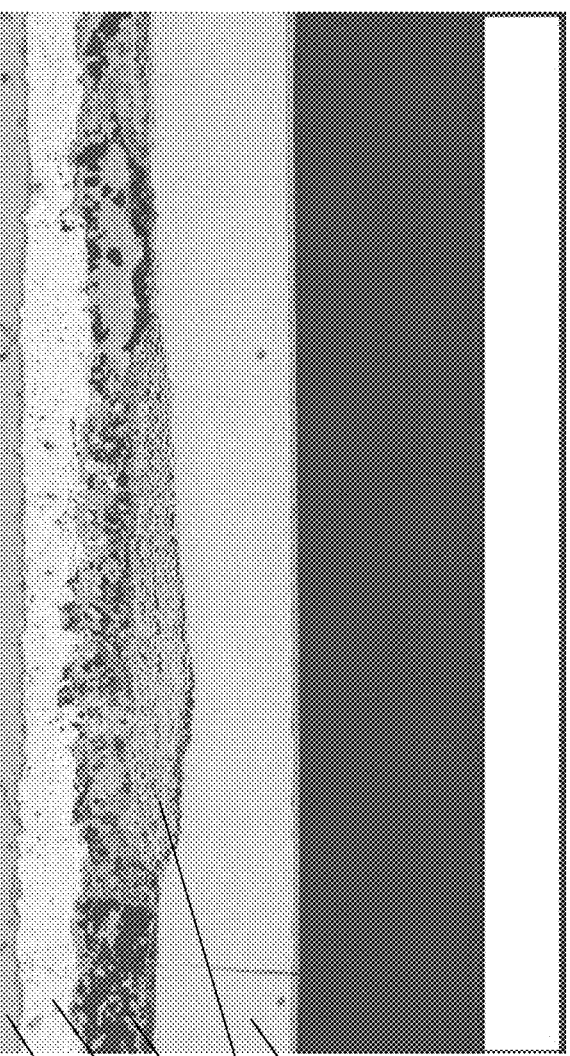
FIG. 12A
FIG. 12B
FIG. 12C

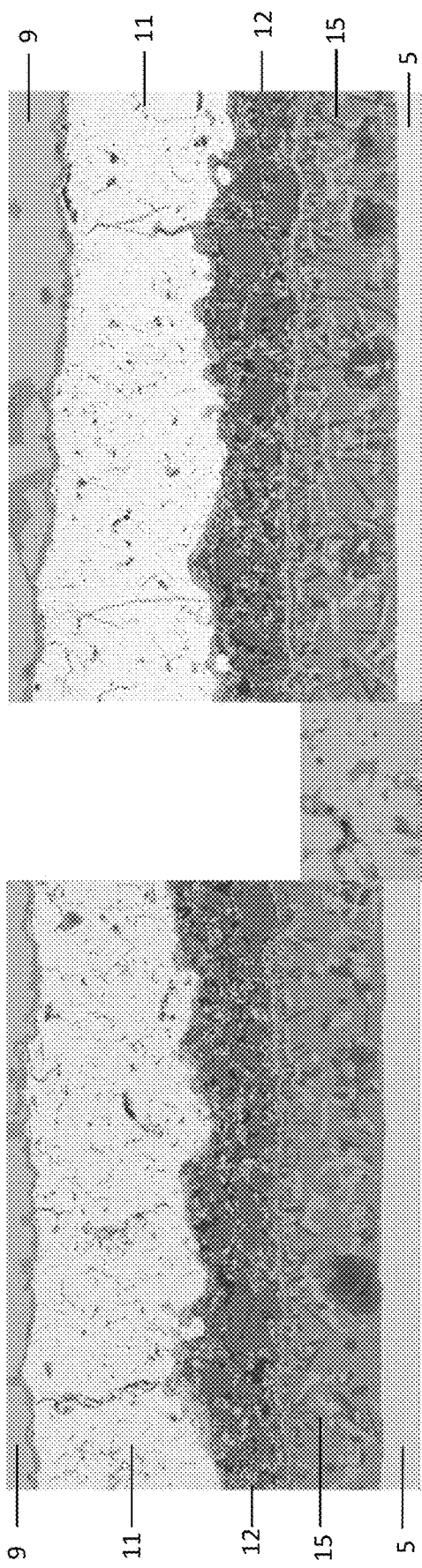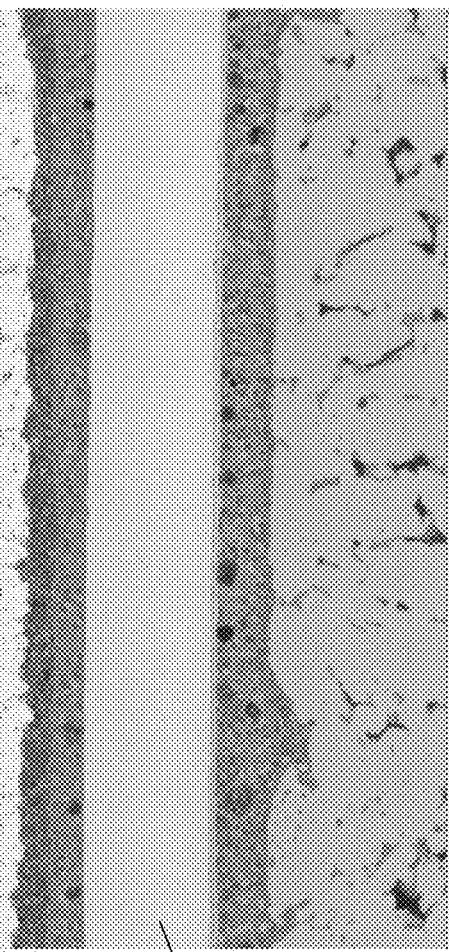
FIG. 13A
FIG. 13B
FIG. 13C

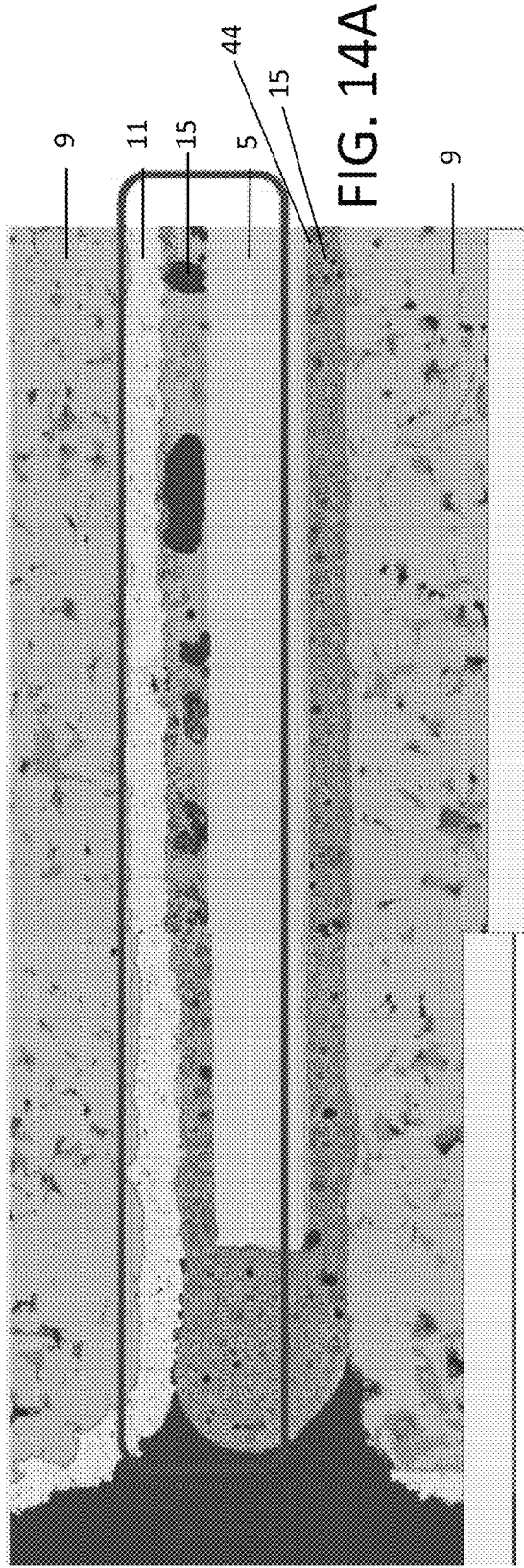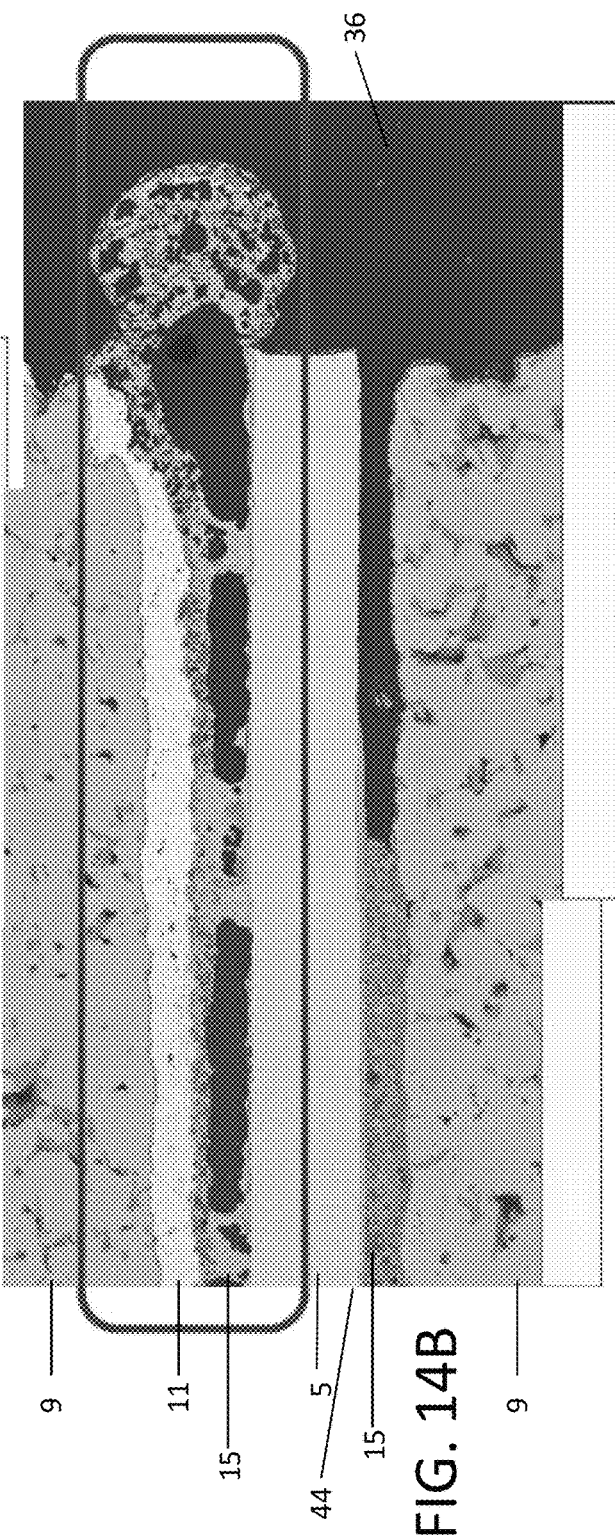

MULTI-LAYERED COATING PROVIDING CORROSION RESISTANCE TO ZIRCONIA BASED ELECTROLYTES

FIELD

The present invention is generally directed to solid oxide fuel cells (SOFC) and more specifically to coatings that provide corrosion resistance to zirconia based electrolytes for solid oxide fuel cells.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. As shown in FIG. 1, in fuel cell stacks that are internally manifolded for fuel (i.e., in which fuel is provided through fuel riser openings in SOFCs and interconnects in the stack) electrolyte crack formation has been observed at ring seals initiated by cell electrolyte corrosion. A ring seal is a seal that surrounds the fuel inlet and fuel outlet riser openings between the cathode (i.e., air) side of a given SOFC and an air side of an adjacent interconnect (also known as a gas separator plate). This corrosion in conjunction with stresses which occur during operation lead to cracks, cell cracking and catastrophic failure at elevated temperatures (e.g., after 2 hours at 900 C) as shown in FIG. 2.

SUMMARY

An embodiment relates to a solid oxide fuel cell (SOFC) stack including a plurality of SOFCs and a plurality of interconnects. Each interconnect is located between two adjacent SOFCs, and each interconnect contains a Mn or Co containing, electrically conductive metal oxide layer on an air side of the interconnect. The SOFC stack also includes a barrier layer located between the electrically conductive metal oxide layer and an adjacent SOFC. The barrier layer is configured to prevent Mn or Co diffusion from the electrically conductive metal oxide layer to the adjacent SOFC.

Another embodiment relates to a planar interconnect for a solid oxide fuel cell (SOFC) including a fuel inlet riser opening, a fuel outlet riser opening, a plurality of first flow channels on an air side of the interconnect and a plurality of second flow channels on a fuel side of the interconnect. The planar interconnect also includes an electrically conductive metal oxide layer covering the air side of the interconnect, and a barrier layer over the conductive metal oxide layer in regions adjacent to the fuel inlet riser opening and the fuel outlet riser opening.

Another embodiment relates to a method of making a stack of solid oxide fuel cells (SOFC). The method includes providing a plurality of SOFCs and providing a plurality of electrically conductive interconnects, each conductive interconnect comprising an electrically conductive metal oxide layer on an air side of the interconnect. The method also includes providing a seal between each of the plurality of the electrically conductive interconnects and an adjacent SOFC in the stack. A barrier layer is located between the conductive metal oxide layer and the adjacent SOFC, the barrier layer configured to prevent Mn or Co diffusion from the metal oxide layer to the adjacent SOFC.

Another embodiment relates to an interconnect for a solid oxide fuel cell (SOFC), comprising, a plurality of first flow channels on an air side of the interconnect, a plurality of second flow channels on a fuel side of the interconnect, and a passivating or protective barrier layer located over at least a portion of the air or the fuel side of the interconnect. The barrier layer comprises at least one of a clay, a ceramic other than a perovskite or a spinel, an alkali earth silicate or a glass ceramic.

BRIEF DESCRIPTION OF THE DRAWINGS

FIG. 1 is a close up of the corrosion and FIG. 2 is a top view of a SOFC containing a crack (circled).

FIGS. 4A and 4B are top views of an air side of an interconnect of an embodiment of the present invention.

FIGS. 6A, 6B and 6C illustrate a portion of a side cross sectional view of a SOFC stack along lines B-B in FIGS. 4B and 5A of embodiments of the invention.

FIGS. 12A, 12B and 12C are micrographs illustrating corrosion of unprotected electrolyte after 2400 hours at 850 C operating at standard fuel cell conditions of current generation, air on the cathode side and natural gas fuel on the anode side. The magnification in FIG. 12A is higher than that in FIGS. 12B and 12C.

FIGS. 13A, 13B and 13C are micrographs illustrating examples of the lack of corrosion of electrolyte protected according to an embodiment of FIG. 6A after 2400 hours at 850 C. The magnification in FIGS. 13A and 13B is higher than that in FIG. 13C.

FIGS. 14A and 14B are compound micrographs illustrating ring seal degradation in a sample without a barrier layer after 2400 hours at 850 C.

DETAILED DESCRIPTION

The present inventors realized that solid oxide fuel cell electrolyte corrosion and cracking may be reduced or eliminated by reducing or eliminating manganese diffusion from an electrically conductive manganese containing perovskite layer on the interconnect into the ceramic electrolyte. The inventors have observed that manganese from the manganese containing perovskite layer diffuses or leaches into a glass or glass ceramic seal and the manganese (and/or a manganese containing compound, such as a manganese rich silicate) then diffuses into the zirconia based electrolyte and accumulates at the electrolyte grain boundaries, resulting in intergranular corrosion of the electrolyte. The inventors further observed that absent a glass seal, manganese from the perovskite layer, such as lanthanum strontium manganate ("LSM"), located on the interconnect does not attack the zirconia based electrolyte, such as yttria and/or scandia stabilized zirconia. In fact, the SOFC cathode electrode directly on the electrolyte may comprise LSM without attacking the electrolyte. Thus, in an embodiment in which a stack is internally manifolded for fuel, corrosion of the stabilized zirconia electrolyte can be reduced or prevented by isolating the electrolyte from manganese diffusion from the conductive perovskite layer by depositing a manganese diffusion barrier between the manganese containing perovskite layer and the glass seal. In another embodiment, the barrier layer may be deposited between the glass seal and the stabilized zirconia electrolyte. Alternatively, barrier layers may be deposited between both the manganese containing perovskite layer and the glass seal and between the glass seal and the stabilized zirconia electrolyte. While the use of the barrier layer with a manganese containing LSM layer is described above, the barrier layer may be used with any other manganese and/or cobalt containing metal oxide layer on the interconnect, such as other perovskite layer (e.g., lanthanum strontium cobaltite or lanthanum strontium manganate-cobaltite) or spinel layer (e.g., a manganese cobalt oxide spinel, such as a $Mn_xCo_{3-x}O_4$ spinel, where x ranges between 1 and 2). However, LSM is used as an exemplary metal oxide coating below for brevity.

Figure 2:
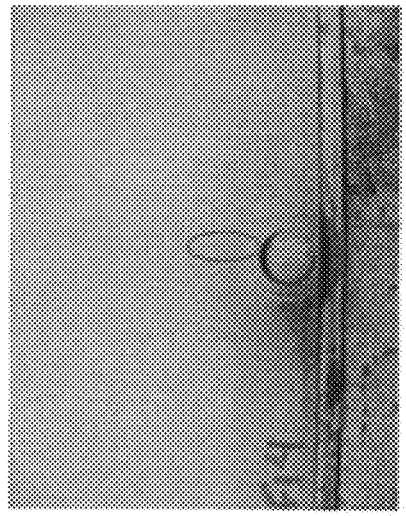
FIGS. 1 and 2 are photographs showing cell electrolyte corrosion and cracking in prior art SOFC stacks.
Figure 1:
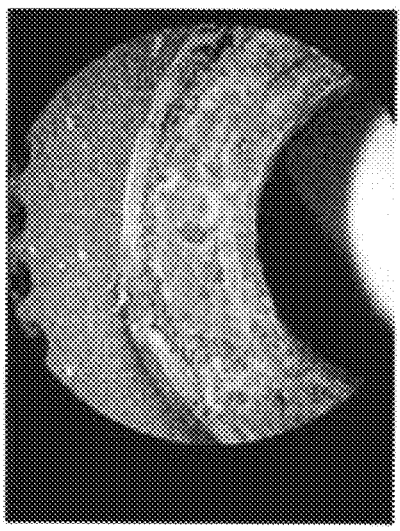
Figure 3:
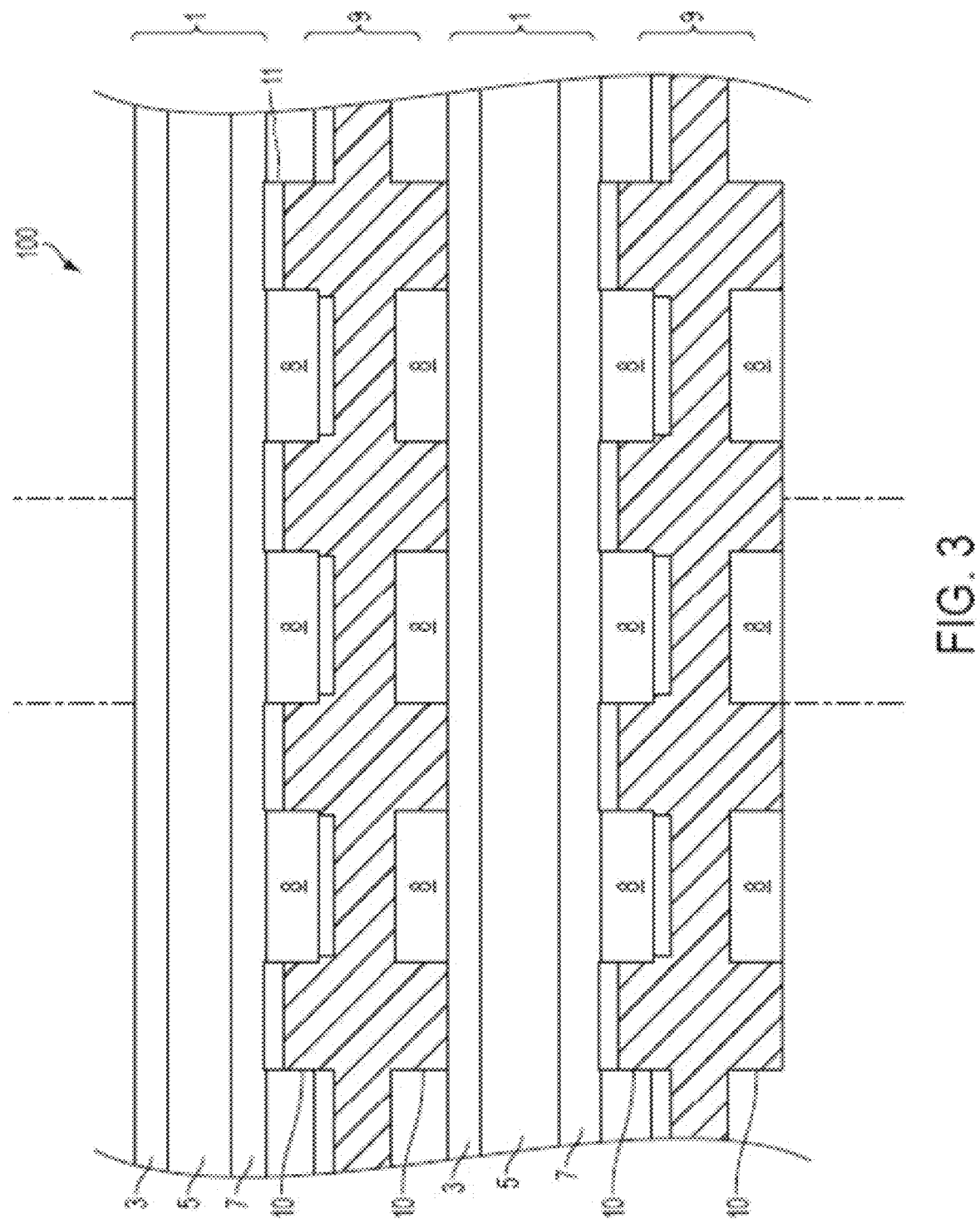
FIG. 3 illustrates a side cross sectional view of a SOFC stack along lines A-A in FIGS. 4A and 5A of an embodiment of the invention.

FIG. 3 illustrates a side cross sectional view through a middle of planar solid oxide fuel cell (SOFC) stack 100. The stack comprises a plurality of solid oxide fuel cells 1 and a plurality of interconnects/gas separator plates 9. Each cell 1 includes an anode electrode 3, a solid oxide electrolyte 5 and a cathode electrode 7. The anode electrode 3 may comprise a cermet having a metal phase, such as a nickel or nickel oxide phase and a ceramic phase, such as a doped ceria (such as samaria or gadolinia doped ceria) and/or a stabilized zirconia, such as yttria or scandia stabilized zirconia. The anode 3 may comprise one or more sublayers comprising the above described cermet or ceramic materials. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used.

FIG. 3 shows that the lower SOFC 1 is located between two interconnects 9. Each interconnect/gas flow separator plate 9 separates fuel, such as a hydrogen and/or a hydrocarbon fuel, flowing to the fuel electrode (i.e. anode 3) of one cell in the stack from oxidant, such as air, flowing to the air electrode (i.e. cathode 7) of an adjacent cell in the stack. The interconnect 9 contains gas flow passages or channels 8 between the ribs 10. The interconnect electrically connects the fuel electrode 3 of one cell to the air electrode 7 of the adjacent cell. The interconnect is made of or contains electrically conductive material, such as chromium or an alloy thereof, such as chromium-iron, chromium-yttrium, chromium-iron-yttrium, etc. A first electrically conductive contact layer, such as a perovskite layer 11, is provided on the air side of the interconnect 9 (i.e., between the interconnect and the cathode electrode 7 of an adjacent fuel cell 1). Layer 11 coats the tops of the ribs 10, the sides of the ribs 10 (not shown for clarity) and the bottoms of the flow passages 8. The perovskite layer 11 is preferably LSM, but may also comprise other perovskite materials. An optional second electrically conductive contact layer (not shown), such as a nickel contact layer, may be provided on the fuel side of the interconnect (i.e., between the anode electrode and the interconnect).

While vertically oriented stacks are shown in FIG. 3, the fuel cells may be stacked horizontally or in any other suitable direction between vertical and horizontal. The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

FIG. 4A shows the air side of an exemplary interconnect 9. The interconnect may be used in a stack which is internally manifolded for fuel and externally manifolded for air. The interconnect contains air flow passages or channels 8 between ribs 10 to allow air to flow from one side 13 to the opposite side 14 of the interconnect. Ring seals 15 are located around fuel inlet and outlet openings 16A, 16B (i.e., through holes 16A, 16B in interconnect 9). Strip seals (not shown) are located on lateral sides of the interconnect 1. FIG. 4B shows a close up view of an exemplary seal 15, passages 8 and ribs 10. The seals 15 may comprise any suitable seal glass or glass ceramic material, such as borosilicate glass. Alternatively, the seals 15 may comprise a glass ceramic material described in U.S. application Ser. No. 12/292,078 filed on Nov. 12, 2008, incorporated herein by reference.

The interconnect 9 may contain an upraised or boss region below the seal 15 if desired. If desired, the interconnect may be configured for a stack which is internally manifolded for both air and fuel. In this case, the interconnect and the corresponding fuel cell electrolyte would also contain additional air inlet and outlet openings.

Figure 4C:
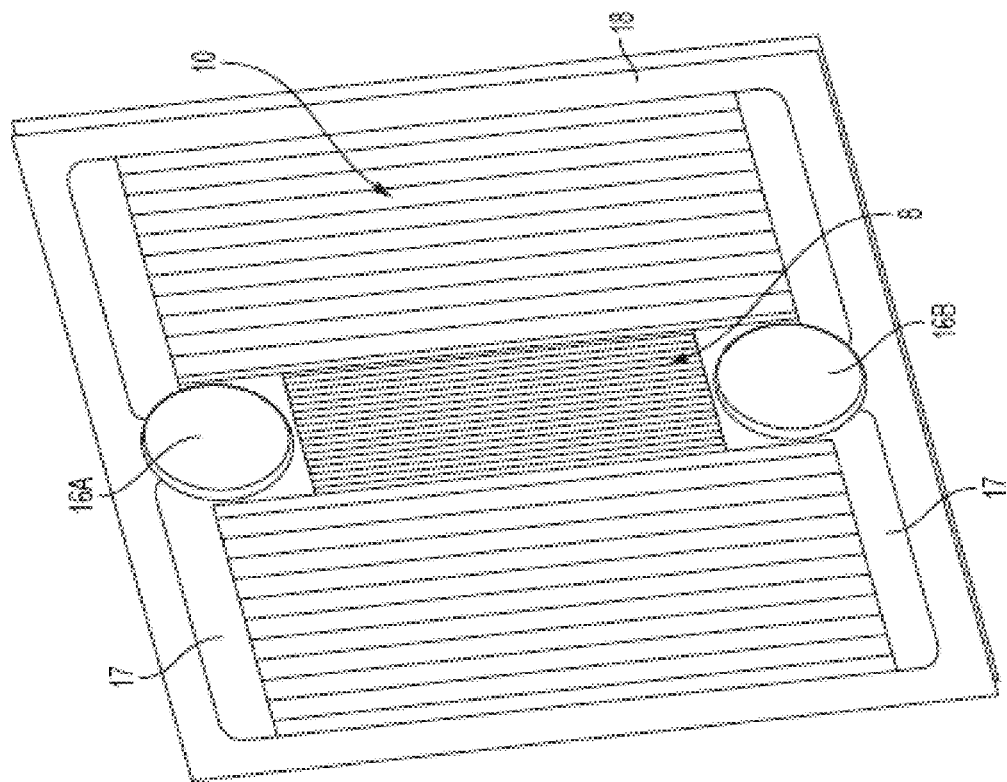
FIG. 4C is a top view of a fuel side of the interconnect.

FIG. 4C illustrates the fuel side of the interconnect 9. A window seal 18 is located on the periphery of the interconnect 9. Also shown are fuel distribution plenums 17 and fuel flow passages 8 between ribs 10. It is important to note that the interconnect shown in FIG. 4C has two types of fuel flow passages; however, this is not a limitation of the present invention. The fuel side of an interconnect may have fuel flow passages that are all the same depth and length, or a combination of short and long, and/or deep and shallow passages.

Figure 5A:
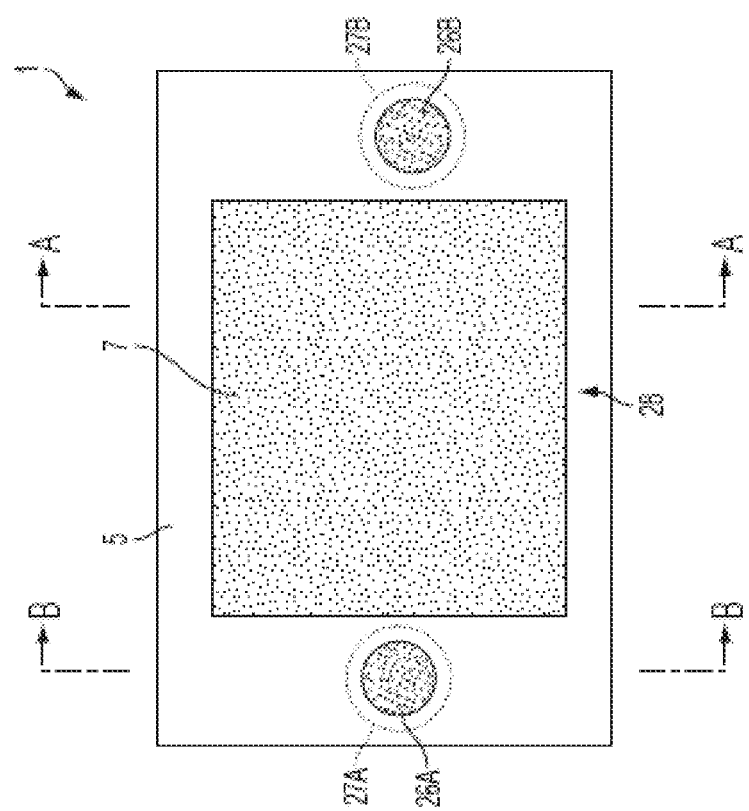
FIGS. 5A and 5B are top views of an air side of fuel cells of an embodiment of the invention.

FIG. 5A illustrates a top view of one SOFC 1 of the stack 100. As shown in FIG. 5A, the SOFC 1 is positioned with the air side of the electrolyte 5 pointing up. The cathode electrode 7 is located in the middle portion of the electrolyte 5. The anode electrode 3 is located on the bottom of the electrolyte and is not shown in FIG. 5A. The electrolyte 5 contains a fuel inlet opening 26A and a fuel outlet opening 26B. The electrolyte also contains ring shaped regions 27A, 27B around the openings 26A, 26B, respectively, and a peripheral region 28. The side cross sectional view of the stack shown in FIG. 3 is taken along lines A-A in FIGS. 4A and 5A. The SOFC 1 is configured for a stack that is internally manifolded for fuel and externally manifolded for air. Alternatively, the SOFC 1 may be configured for a stack which is internally manifolded for both air and fuel. In this case, the electrolyte would contain additional air inlet and outlet openings.

Figure 5B:
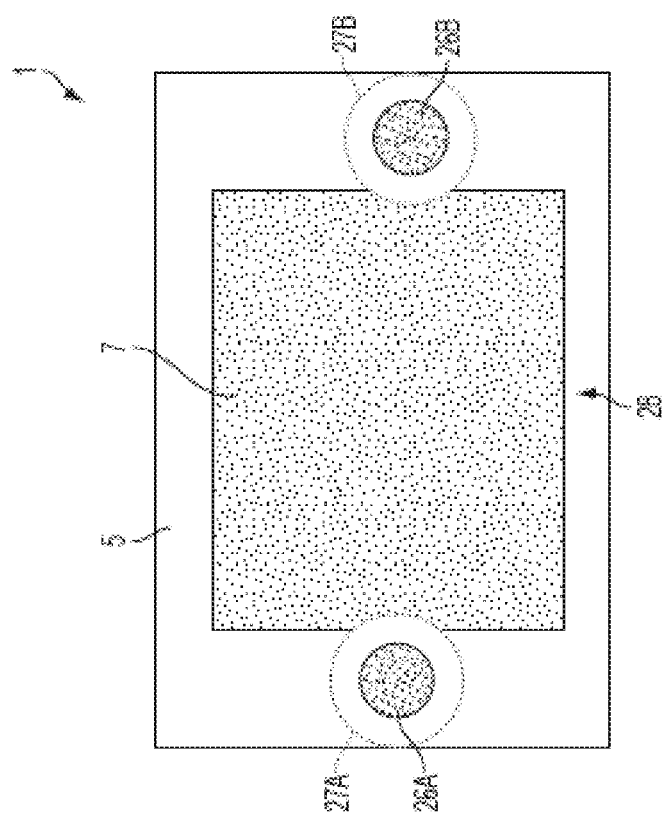

Optionally, at least one side of the electrolyte 5, such as the air side, has a smaller roughness in first 27A and second 27B regions adjacent to the fuel inlet and fuel outlet openings 26A, 26B than in a third region under the cathode electrode 7, as shown in FIGS. 5A and 5B. Regions 27A, 27B may comprise ring shaped regions which surround the fuel inlet and outlet openings 26A, 26B. Regions 27A, 27B may have any suitable shape, such as hollow circular, oval, polygonal, etc. The fuel cell electrodes, such as the anode or cathode, may have a straight edge, as shown in FIG. 5A, with the regions 27A, 27B located adjacent to the straight edges. Alternatively, the boundaries of the smooth electrolyte regions 27A, 27B may protrude into the side portions of the electrodes 3 or 7. In this case, the electrodes 3, 7 may have a curved side edges as shown in FIG. 5B.

Openings 26A, 26B in electrolyte 5 are lined up with the respective openings 16A, 16B in the interconnect 9 to form portions of the fuel inlet and outlet risers of the stack, as will be described in more detail with respect to FIGS. 6A-6C below. A fuel riser is a series of connected openings through the interconnect 9 and/or through one or more layers of the SOFC 1, such as the anode, cathode, and/or electrolyte through which a fuel inlet or fuel outlet streams pass through the stack 100.

Figure 6C:
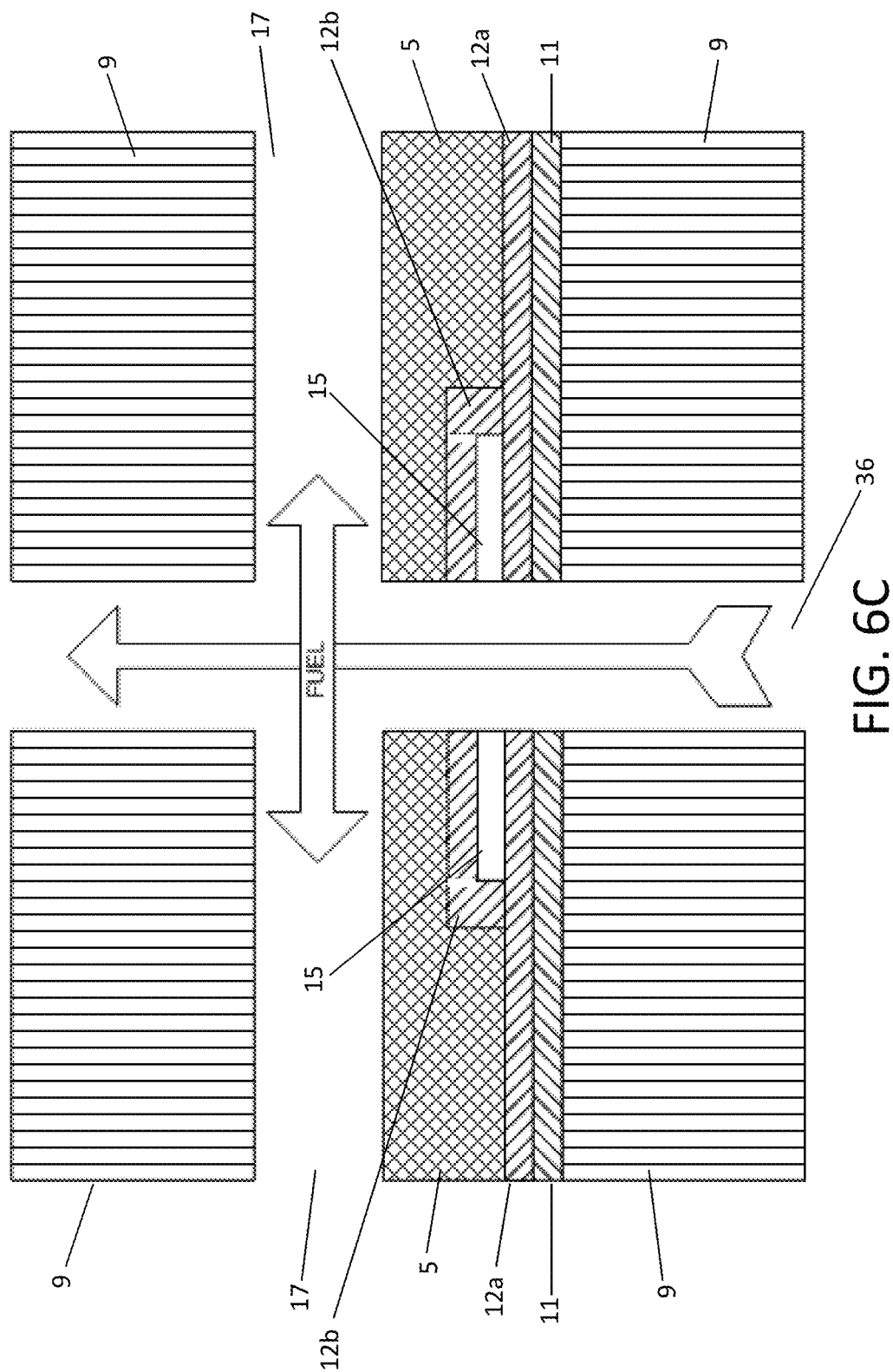

FIGS. 6A-6C illustrate a portion of a side cross sectional view along lines B-B in FIGS. 4B and 5A of the fuel inlet riser portion of the SOFC stack 100 for three different embodiments. FIGS. 6A-6C illustrate how the electrolyte 5 is protected from manganese and/or cobalt (and/or a manganese and/or cobalt containing compound, such as a manganese or cobalt rich silicate) diffusion from the electrically conductive metal oxide layer 11, such as a perovskite or spinel layer, for example an LSM layer on the interconnect 9, through a glass (or glass ceramic) seal 15 into the electrolyte 5. In all three embodiments, one or more manganese/cobalt diffusion barrier layers 12a, 12b are located between the electrolyte 5 and the conductive perovskite layer 11 in the areas where the seal(s) 15 are located (e.g., in projections of areas 27A and 27B on the electrolyte). In all three embodiments, the LSM layer 11 is located on the air surface of the interconnect 9. The LSM layer directly physically contacts the cathode electrode 7 on the electrolyte 5 of the adjacent SOFC in areas of the electrolyte 5 that are not covered by the seal(s) 15. Thus, the barrier layer(s) are located around a fuel riser opening 36 between the seal 15 and at least one of the perovskite layer 11 and the electrolyte 5 but not over the SOFC cathode electrode 7 and preferably not over the ribs 10 and flow channels 8 in the interconnect 9.

In FIG. 6A, the manganese diffusion barrier 12a is located on the LSM layer 11 below the ring seal 15 and the electrolyte 5. In FIG. 6B, the manganese diffusion barrier 12b is located on the ring seal 15 between the seal and the electrolyte 5. Preferably, the barrier 12b is located on both the top and side(s) of the ring seal 15 to completely separate the seal from the electrolyte. In this embodiment, manganese that diffuses into and reacts with the ring seal 15 material is prevented from reaching the electrolyte 5 by the diffusion barrier 12b. In FIG. 6C, two manganese diffusion layers 12a, 12b are provided. The first manganese diffusion barrier 12a is located on the LSM layer 11 below the ring seal 15 and the electrolyte 5 as provided in the embodiment illustrated in FIG. 6A. The second manganese diffusion barrier 12b is located on the top and sides of the ring seal 15 as provided in the embodiment illustrate in FIG. 6B. The first and second manganese diffusion barrier layers 12a, 12b may be made from the same or different materials. In this embodiment, the second manganese diffusion barrier 12b provides extra diffusion prevention should any manganese diffuse from the LSM layer 11 into the ring seal 15. While ring seals 15 are described above, it should be noted that the barrier layer(s) 12a, 12b, may be located adjacent to any other seals on the air side.

The manganese diffusion barrier 12a, 12b may be made of any suitable material that can block manganese and/or a manganese containing compound diffusion, such as a clay, ceramic and/or glass ceramic material. Specific materials include, but are not limited to alumina (e.g., non-stoichiometric alumina or stoichiometric $Al_2O_3$), zirconia (e.g., non-stoichiometric zirconia or stoichiometric $ZrO_2$), zirconium silicate $ZrSiO_4$, calcium, barium, magnesium and/or aluminum silicate, feldspar (such as potassium feldspar) and combinations thereof. In one embodiment, the barrier layer comprises a combination of a clay and at least one of a glass ceramic or a ceramic, such as a mixture of potassium feldspar and zirconium silicate. The mixture may comprise a 25-75:75-25 volume fraction ratio, such as 50:50 volume fraction ratio of the clay to the ceramic or the glass ceramic. Alternatively, the calcium, barium, magnesium and/or aluminum silicate can be used as a glassy phase in combination with the feldspar and/or zirconium silicate as the polycrystalline (i.e., ceramic) phase.

Similar to the other SOFC ceramic components, such as the electrolyte 5, the diffusion barrier 12a, 12b may be made from a sintered powder or a mixture of powders (e.g., a mixture of clay and ceramic powders). The sintering temperature may be selected depending on the material of the manganese diffusion barrier 12 and may be, for example, greater than 900 C, or greater than 100° C. The diffusion barrier material preferably comprises a dense sintered material, such as a polycrystalline and/or a sintered packed powder material. Barrier layer 12a is deposited on the conductive perovskite layer 11 while barrier layer 12b is preferably deposited on the electrolyte 5.

Thus, the manganese diffusion barrier layer(s) 12a and/or 12b are located between the conductive perovskite layer 11 and the electrolyte 5. The diffusion barrier layer may be located between the conductive perovskite layer 11 and the glass ring seal 15 (barrier layer 12a) or between the glass ring seal 15 and the electrolyte 5 (barrier layer 12b) or in both locations. Thus, even if manganese diffuses from the conductive perovskite layer 11 into the glass ring seal 15, the manganese cannot further diffuse into the electrolyte layer 5.

FIGS. 6A-6C show one ring shaped glass (or glass ceramic) "ring" seal 15 and adjacent barriers (e.g., 12a) which is located on the air side of each interconnect 9 adjacent the fuel inlet opening 16A (i.e., a portion of the fuel inlet riser 36) in the interconnect 9 and LSM layer 11. As shown in FIG. 6A, the interior opening 36A in the seal 15 and barrier layer 12a is located over the opening 16A in the interconnect. The seal 15 also contacts an electrolyte 5 of an adjacent SOFC 1 in a region adjacent to a fuel inlet opening 26A in the electrolyte, such that the opening 26A in the electrolyte, the interior opening 36A in the seal 15 and barrier 12a, and the opening 16A in the interconnect form a portion of the fuel inlet riser 36.

A second ring seal 15 and barrier layer(s) around the fuel outlet opening 16B in the interconnect 9 are not shown for clarity. However, it should be understood that a second ring shaped glass or glass ceramic seal 15 and barrier layer(s) 12a and/or 12b are located on the air side of each interconnect 9 over the fuel outlet opening 16B in the interconnect 9 as shown in FIG. 4A. The opening 26B in the electrolyte, the interior opening in the second seal 15 and second barrier(s) and the opening 16B in the interconnect form a portion of the fuel outlet riser.

Figure 7:
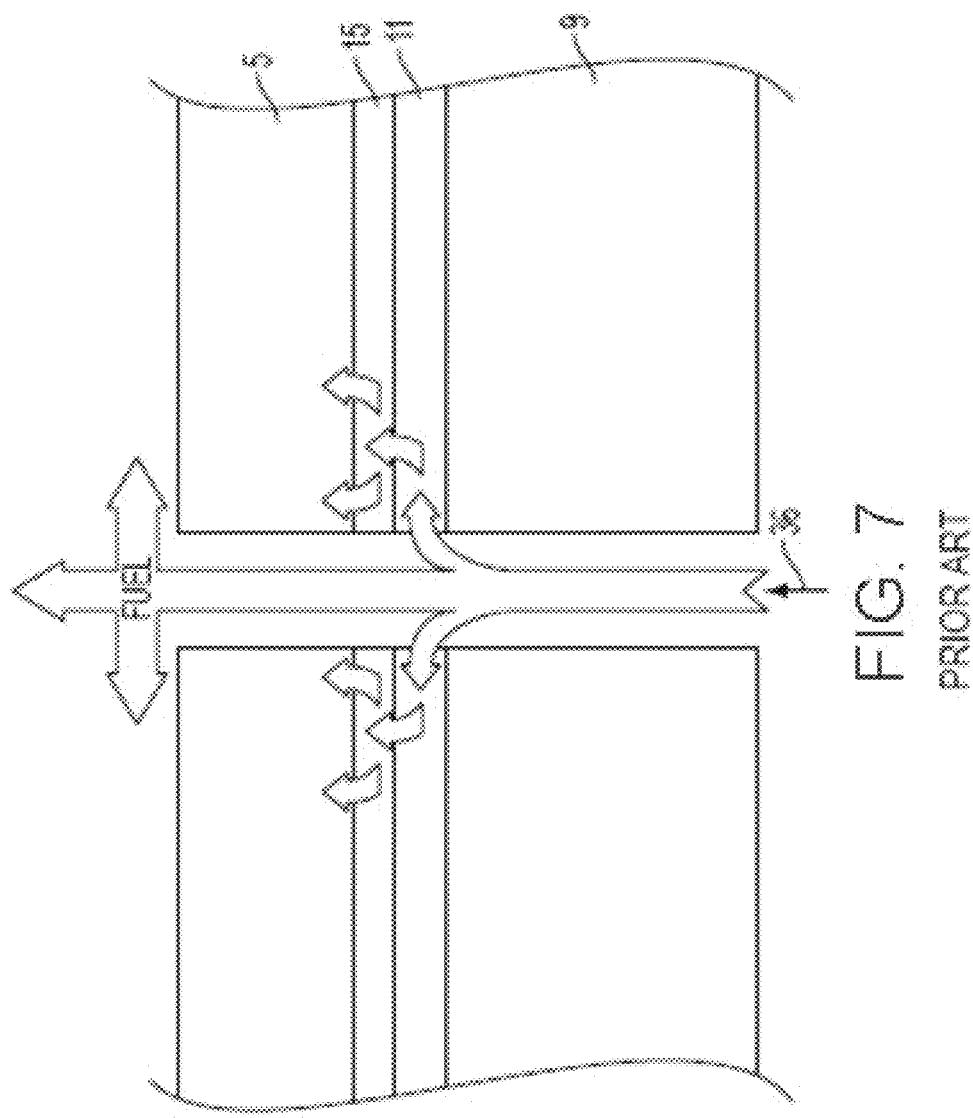
FIG. 7 illustrates a portion of a side cross sectional view of a prior art SOFC stack.
Figure 8:
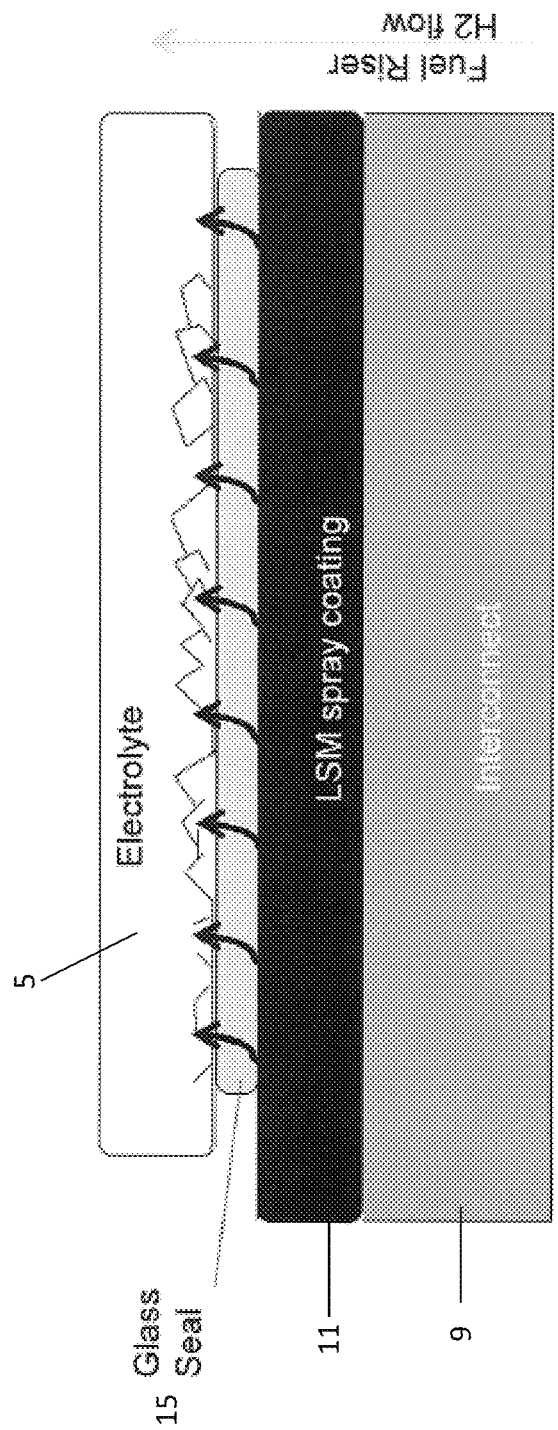
FIG. 8 is a schematic illustration of a theory of intergranular corrosion of the electrolyte.

FIGS. 7 and 8 illustrate a theory of electrolyte corrosion. In the prior art SOFC stack shown in FIGS. 7 and 8, the LSM layer 11 is located in contact with the ring seal 15. Without wishing to be bound by a particular theory, it is believed that manganese and/or cobalt from the manganese and/or cobalt containing metal oxide (e.g., LSM) layer 11 leaches into and/or reacts with the glass seal 15 and is then transported from the glass to the electrolyte. The manganese and/or cobalt may be transported from the glass to the electrolyte as manganese and/or cobalt atoms or ions or as a manganese and/or cobalt containing compound, such as a manganese and/or cobalt rich silicate compound. For example, it is believed that manganese and/or cobalt react with the glass to form a $(Si, Ba)(Mn, Co)O_{6\pm\delta}$ mobile phase which is transported from the glass seal to the electrolyte. The manganese and/or cobalt (e.g., as part of the mobile phase) at or in the electrolyte 5 tends to collect at the grain boundaries of the zirconia based electrolyte. This results in intergranular corrosion and pits which weaken the electrolyte grain boundaries, ultimately leading to cracks (e.g., hole 26A to hole 26B cracks) in the electrolyte 5. Without being bound by a particular theory, it is also possible that the fuel (e.g., natural gas, hydrogen and/or carbon monoxide) passing through the fuel inlet riser 36 may also react with the metal oxide layer 11 and/or the glass seal 15 to create the mobile phase and to enhance manganese and/or cobalt leaching from layer 11 into the seal 15, as shown in FIG. 7.

The barrier(s) 12a, 12b of the embodiments of the invention reduce or prevent the interaction of the components of the LSM coating (or another Mn or Co containing metal oxide coating) with the silica based glass seals and/or prevent the interaction of manganese contaminated silica based glass seals with the electrolyte. Specifically, a barrier layer which preferably lacks any Mn and/or Co (or at least contains less than 5 at % of Mn and/or Co) prevents Mn and/or Co diffusion from the metal oxide layer into the glass seal and/or prevents the Mn and/or Co containing mobile phase diffusion from the glass seal to the electrolyte.

A method of forming a planar, electrolyte supported SOFC stack shown in FIGS. 3 and 6A-6C includes forming SOFCs 1 and interconnects 9 and alternating these SOFCs and interconnects in a stack 100. The method of forming the SOFC 1 comprises providing a green ceramic electrolyte having an initial roughness. The green electrolyte may be formed by tape casting or other suitable ceramic fabrication methods. The green electrolyte contains a binder and optionally other suitable additives that are removed during subsequent firing or sintering. The green electrolyte may have an as-cast roughness, $R_a$, of 8-12 microinches.

Then, the fuel inlet and fuel outlet openings 26A, 26B are punched in the green electrolyte. The openings 26A, 26B may be punched after the electrolyte 5 is formed into its final shape from a green tape. Alternatively, the electrolyte 5 may be punched into its final shape (such as a rectangular shape) from a green tape during the same punching step as the opening 26A, 26B punching step. In other words, the same punch apparatus may be used to punch out the electrolyte from the green tape and form openings in the electrolyte during a single punch step. Optionally, the punch die has a smoother surface adjacent to the tip portion used to punch the openings. The smooth surface of the punch die smoothes the surface in regions 27A, 27B of the electrolyte 5 such that these regions have a roughness of less than 4 microinches. Opposing punch die may have opposing smooth surfaces adjacent to the tip used to punch the openings to form the smooth regions 27A, 27B on both sides of the electrolyte 5. Alternatively, only one die may have a smooth surface to form smooth regions on only one side of the electrolyte 5.

Optionally, one or both die of the punch apparatus may also have a rough surface to roughen the active regions on one or both sides of the electrolyte 5 under the cathode and/or anode electrodes to achieve a roughness of greater than 32 microinches. Thus, the electrolyte may be hole punched, smoothed around the openings and roughened in the active area in the same punching/pressing steps. Peripheral region 28 may be left with the initial as-cast roughness of about 8-12 microinches or it may be roughened together with the active region(s). Alternatively, other suitable smoothing and/or roughening methods described in U.S. Pat. No. 7,045,237, which is incorporated herein by reference in its entirety, may be used instead of the die punching methods.

After the optional smoothing/roughening step, a cathode electrode is formed on the first side of the electrolyte and an anode electrode is formed on the second side of the electrolyte (such as on a roughened region on the fuel side of the electrolyte). The electrodes may be formed by screen printing or other suitable deposition methods. At least one of the electrolyte, cathode electrode and the anode electrode are then fired or sintered. One or more firing or sintering steps may be conducted. For example, one firing step may be conducted after the hole punching, another firing step after cathode deposition and a third firing step after the anode deposition. The anode and cathode deposition may be performed in either order. The three firing steps may be combined into two firing steps or into a single firing step after both electrodes are deposited.

If desired, the second barrier layer 12b shown in FIGS. 6B and 6C may be formed on the cathode side of the electrolyte 5 by depositing the barrier powder (optionally with a binder) around the fuel riser openings followed by burning out the binder and sintering the powder. The barrier layer 12b may be deposited and sintered before, after, or at the same time as the cathode electrode 7. The first barrier layer 12a shown in FIGS. 6A and 6B may be deposited on the interconnect as a barrier powder (optionally with a binder) around the fuel riser openings followed by burning out the binder and sintering the powder before the seals 15 are formed on the barrier 12a and the interconnect is placed into the stack.

In another embodiment, the barrier layer 12 is formed on portions of the interconnect that are not covered by the metal oxide layer 11 (e.g., LSM, etc.) or on interconnects that completely lack the metal oxide layer 11 coating. In this embodiment, the barrier layer 12 does not act as a manganese diffusion barrier, but acts to passivate and/or protect the surface of the interconnect. Therefore, the barrier layer 12 acts as a passivation and/or protective barrier for the interconnect. The barrier layer 12 may be formed on the air and/or fuel sides of an interconnect that lacks the metal oxide layer 11. Alternatively, the barrier layer 12 may be formed on the fuel side and/or on peripheral portions of the interconnect in which the metal oxide layer 11 is formed on the central portion of the air side of the interconnect. The barrier layer may comprises at least one of a clay, a ceramic other than a perovskite or a spinel (e.g., a material different from LSM and other typical air side IC coatings), an alkali earth silicate or a glass ceramic, as described in the prior embodiments.

FIGS. 9-16 include micrographs illustrating the results of corrosion testing of embodiments incorporating diffusion barrier layer(s) 12a, 12b and comparative examples lacking diffusion barrier layer(s) 12a, 12b.

Figure 9B:
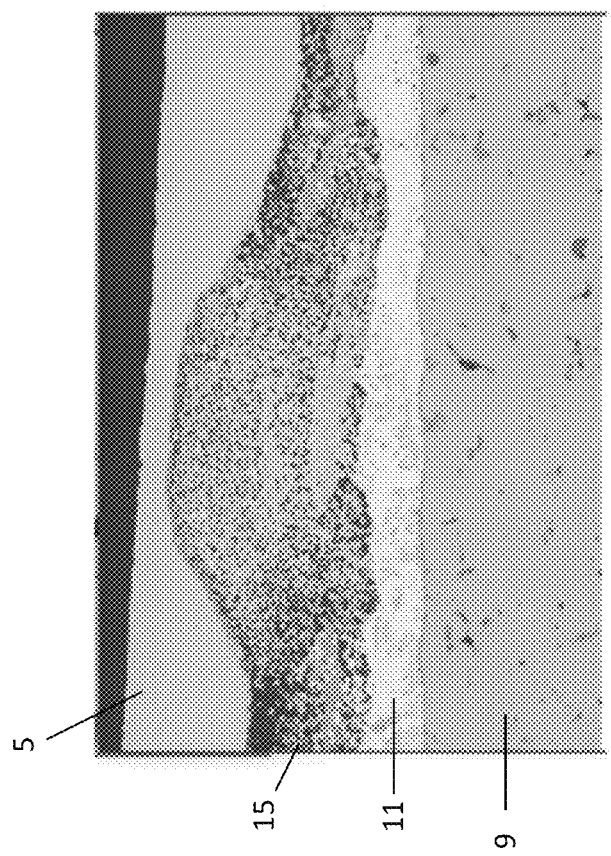
FIGS. 9A and 9B are micrographs illustrating glass seal reaction and electrolyte corrosion due to manganese diffusion. The tests were run at 900 C for 24 hours under hydrogen fuel.
Figure 9A:
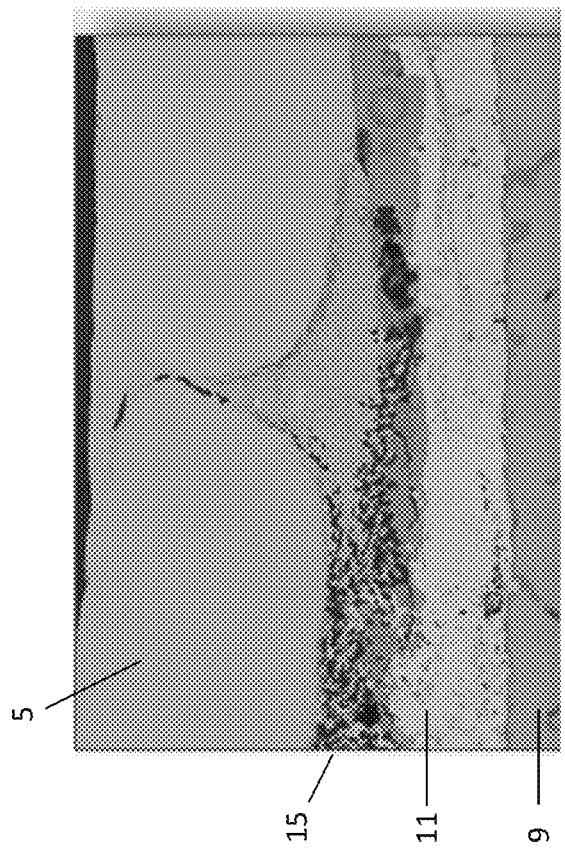

In the comparative examples illustrated in FIGS. 9A and 9B, the test specimens included a Cr—Fe alloy interconnect 9 coated with a LSM perovskite layer 11 on it air side, a glass layer 15 and a zirconia based electrolyte 5. The specimens were heated for 24 hours at 900 C. As can be seen in both FIGS. 9A and 9B, the glass layer 15 has reacted with the electrolyte 5, resulting in the glass layer penetrating into the electrolyte 5.

Figure 10:
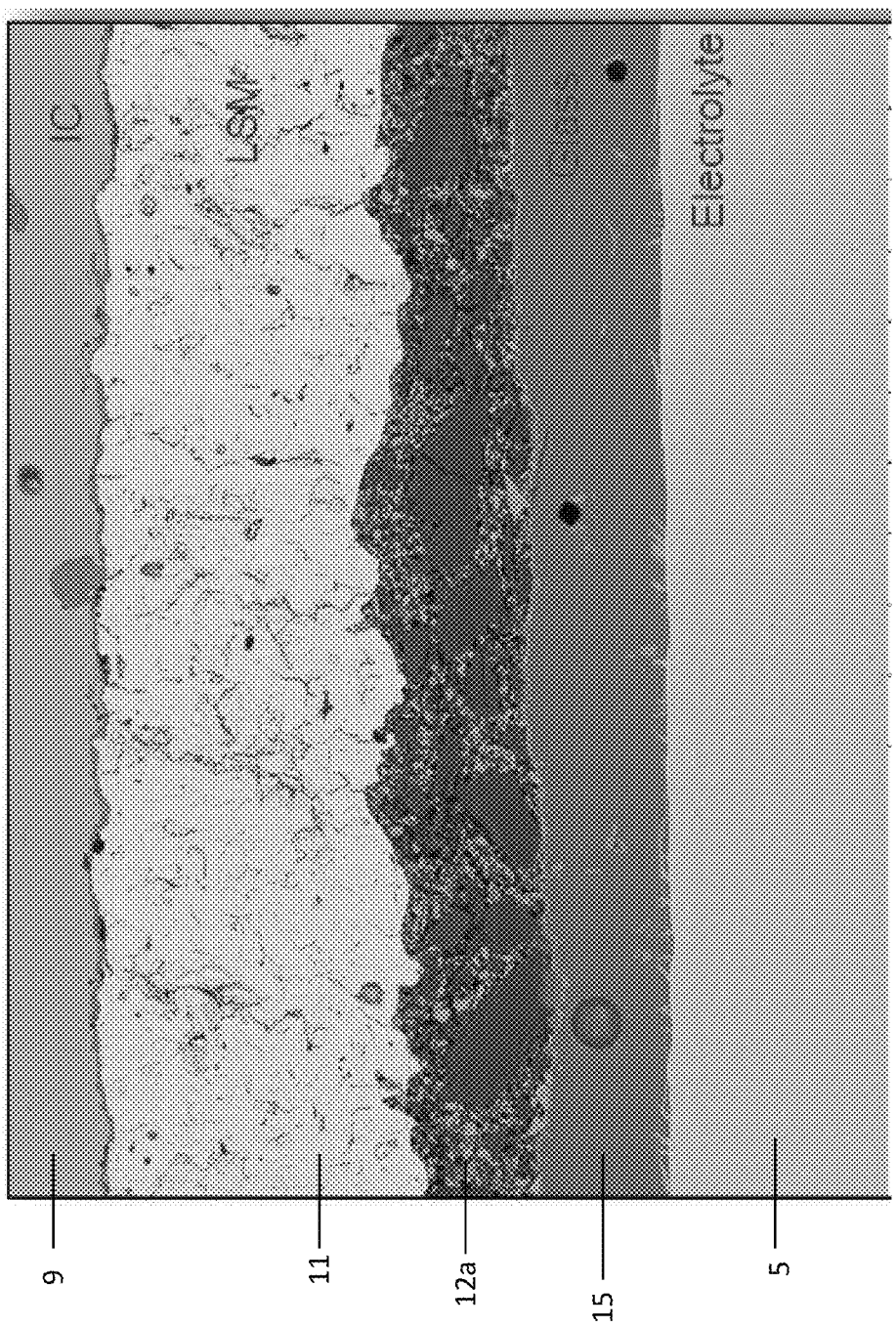
FIG. 10 is a micrograph illustrating an embodiment of the invention.

FIG. 10 is a micrograph illustrating an embodiment of the invention. In this embodiment, a manganese diffusion barrier layer 12a has been deposited between the glass layer 15 and the perovskite layer 11. The barrier layer 12a is a mixture of Zircon (zirconium silicate, $ZrSiO_4$) and potassium feldspar.

Figure 11B:
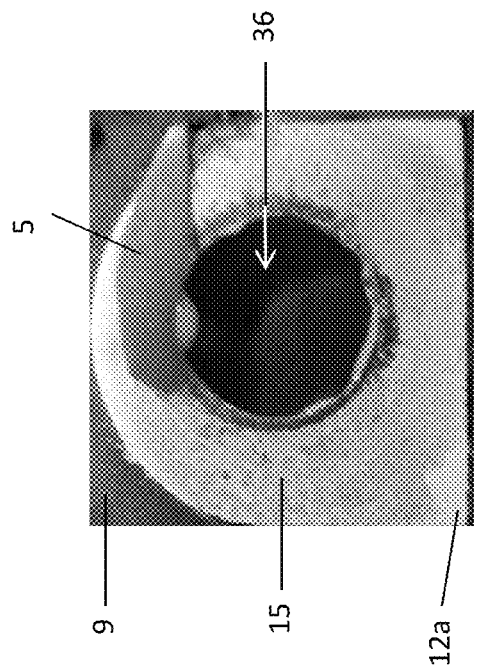
FIGS. 11A and 11B are photographs illustrating (A) corrosion pits in a glass seal on an interconnect which lacked a barrier layer and (B) a glass seal without corrosion pits located on a barrier layer on an interconnect.
Figure 11A:
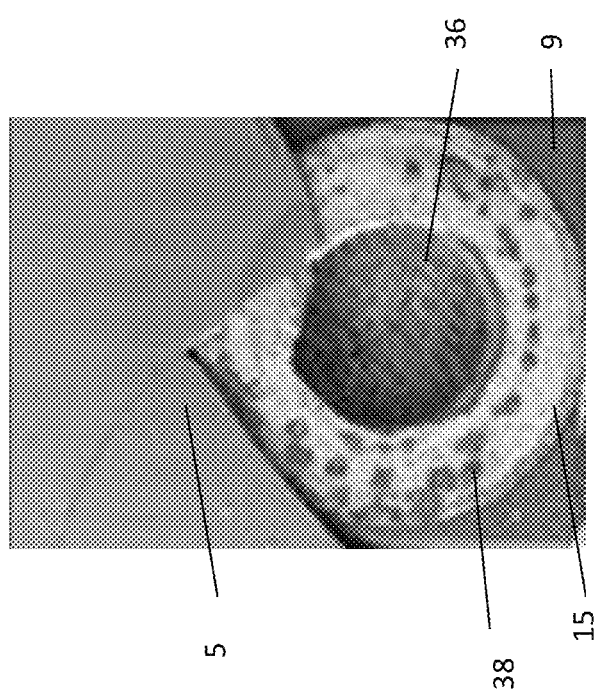

A comparison of samples with and without the barrier layer 12a is illustrated in FIGS. 11B and 11A, respectively. As can be seen in FIG. 11A, lack of a protective barrier layer 12a results in the formation of a corroded region 38 (dark spots corresponding to pits) which is imprinted in the seal 15 from the partially removed electrolyte 5. In contrast, the sample with the barrier layer 12a shows no corrosion of the electrolyte.

FIGS. 12A, 12B and 12C are micrographs at different magnifications illustrating corrosion of unprotected electrolyte after 2400 hours at 850 C. Absent a barrier layer, the manganese and/or a component of the glass layer 15 reacts with the electrolyte 5, resulting in a corroded region 38 in the electrolyte. As shown in the figures, the corroded region 38 consumes the electrolyte 5 while displacing the seal 15.

FIGS. 13A, 13B and 13C are micrographs at different magnifications illustrating examples of the lack of corrosion of an electrolyte protected by the barrier 12 according to an embodiment of the invention shown in FIG. 6A after 2400 hours at 850 C. FIG. 13C was taken at the lowest magnification while FIGS. 13A and 13B are higher magnifications views of the left and right portions, respectively, of the specimen illustrated in FIG. 13C. In contrast with the specimen illustrated in FIGS. 12A-12C, the boundary between the glass layer 15 and the electrolyte 5 is sharp, showing no corrosion. Thus, the diffusion boundary layer 12a has successfully prevented diffusion of the corroding species (e.g., Mn) from the peroskite layer 11 to the electrolyte 5.

FIGS. 14A and 14B are micrographs illustrating ring seal degradation in a solid oxide fuel cell stack without the barrier(s) after 2400 hours at 850 C. The sample includes two interconnects 9, a strengthening layer 44, electrolyte 5, a glass ring seal 15 and a perovskite layer 11. The strengthening (i.e., support) layer 44 is a multi-component material comprising yttria stabilized zirconia and alpha alumina which is located around the at least one of a periphery of the electrolyte or at least partially around perimeters of the fuel inlet and fuel outlet riser openings. The anode and cathode electrodes are not resolved in the micrographs. The ring seal 15 encapsulates the electrolyte 5. As can be seen in FIG. 14B, the portion of the ring seal 15 adjacent the fuel inlet riser 36 has been severely compromised. FIG. 14B also illustrates that the damage to the glass ring seal 15 extends from the fuel inlet riser 36 well into the stack.

Figure 15A:
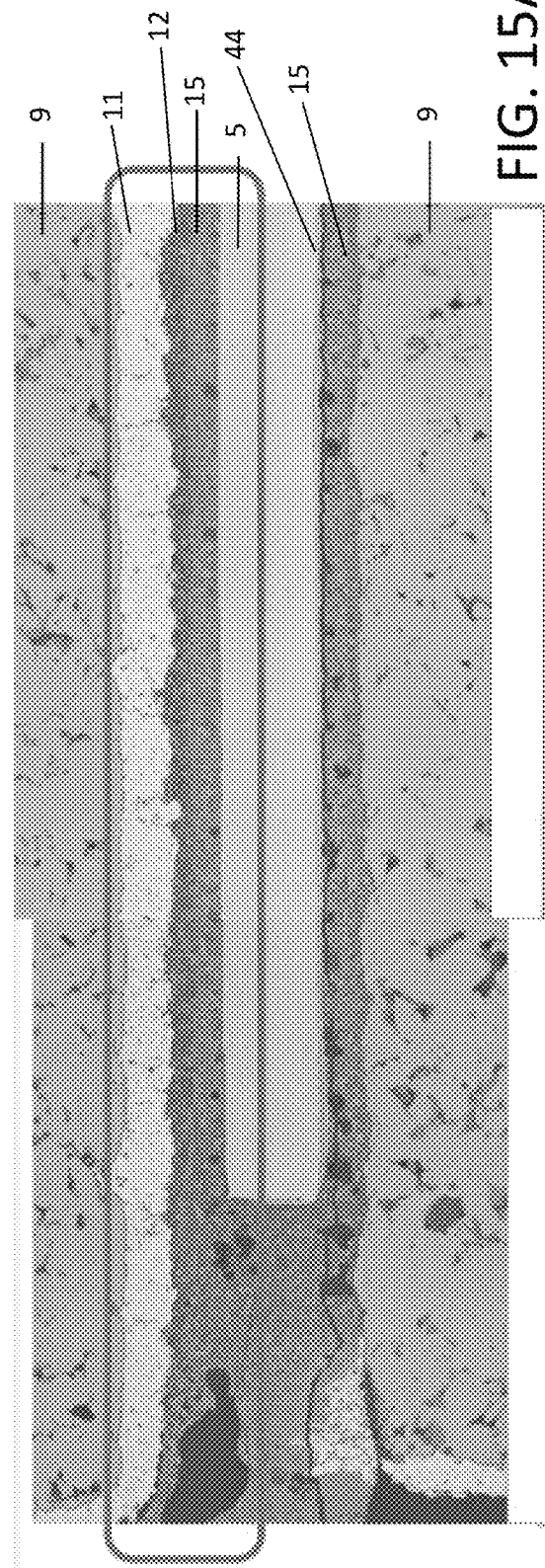
FIGS. 15A and 15B are compound micrographs illustrating the benefits of the addition of the diffusion barrier layer on the interconnect under the ring seal as shown in FIG. 6A after 2400 hours at 850 C.
Figure 15B:
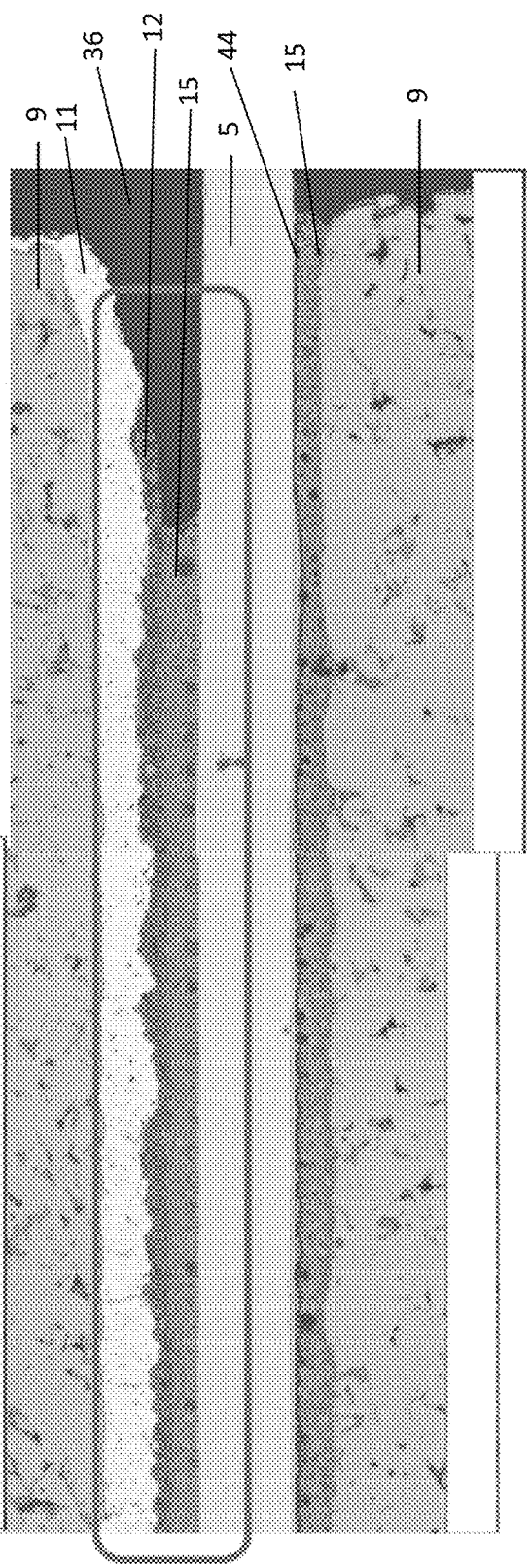
Figure 16:
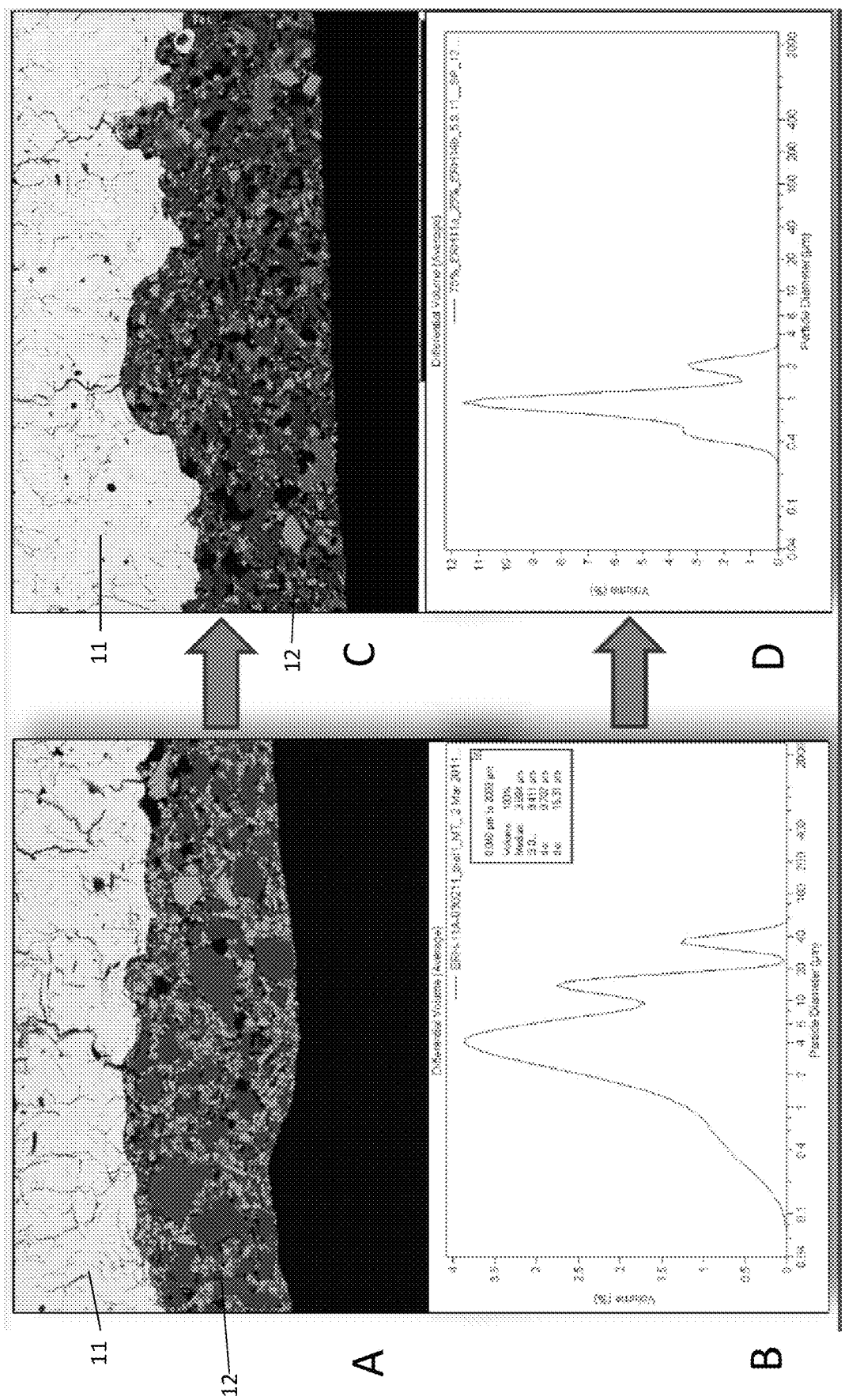
FIGS. 16A and 16C are micrographs illustrating the microstructure of barrier layers according to embodiments of the invention.
FIGS. 16B and 16D are plots of percent volume versus particle diameter illustrating the particle size distribution of the barrier layer in embodiments illustrated in FIGS. 16A and 16C.

FIGS. 15A and 15B are micrographs illustrating the benefits of the addition of the diffusion barrier layer 12a between the LSM layer 11 and the ring seal 15 after operation for 2400 hours at 850 C. The components of the test SOFC stack in this example corresponds to the test stack in the example illustrated in FIGS. 14A and 14B with the addition of the diffusion barrier 12a located between the ring seal 15 and the perovskite layer 11. As can be seen from FIGS. 15A and 15B, the diffusion barrier 12a decreases degradation of the ring seal 15 in addition to reducing or eliminating the corrosion of the electrolyte 5.

FIGS. 16A and 16C are micrographs illustrating the microstructure of barrier layers 12 according to embodiments of the invention while FIGS. 16B and 16D are plots illustrating the particle size distribution of the embodiments illustrated in FIGS. 16A and 16C, respectively. The barrier layers 12 illustrated in FIGS. 16A and 16B comprise a sintered mixture of potassium feldspar and zircon in a volume fraction ratio of about 50:50. The Ca, Ba and/or Mg silicate (i.e., an alkali earth silicate written as (Ca, Ba, Mg) silicate) glassy phase may also be added. The barrier layer 12 illustrated in FIG. 16A was made with material having a median particle size of approximately 4 microns and a standard deviation of approximately 8.4 microns. As used herein, the term particle refers to a polycrystalline region of the same phase (e.g., feldspar) in the barrier layer. The light particles in FIG. 16A are the zirconium silicate particles and the dark particles are the potassium feldspar particles. Experiments with barrier layers 12 made from this material show occasional cohesive failures at large particles. The barrier layer 12 illustrated in FIG. 16B was made with material having a smaller median particle size, approximately 1 micron, and a smaller standard deviation. No cohesive failures were found with barrier layers made from this material. Thus, it is preferable that the barrier layer have a small average grain or particle diameter, such as 2 microns or less, for example 0.5 to 1.5 microns. Thus, the barrier layer may comprise crushed and fused particles of glass ceramic and polycrystalline ceramic.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide fuel cell (SOFC) stack, comprising:
a plurality of SOFCs;
a plurality of interconnects, each interconnect located between two adjacent SOFCs, and each interconnect comprising a Mn or Co containing, electrically conductive metal oxide layer on an air side of the interconnect;
a barrier layer located between each electrically conductive metal oxide layer and a cathode side of an adjacent SOFC, the barrier layer configured to prevent Mn or Co diffusion from the electrically conductive metal oxide layer to the adjacent SOFC; and
silica based glass or glass ceramic seal located between the air side of each interconnect and a cathode side of each adjacent SOFC,
wherein the barrier layer comprises $ZrSiO_4$ and Mg silicate glass ceramic.

2. The SOFC stack of claim 1, wherein the barrier layer has an average grain or particle size of 2 microns or less.

3. The SOFC stack of claim 1, wherein the barrier layer is located between the electrically conductive metal oxide layer and the seal.

4. The SOFC of claim 1, wherein the barrier layer is located between the seal and the adjacent SOFC.

5. The SOFC stack of claim 1, wherein the SOFC stack comprises a first barrier layer located between the electrically conductive metal oxide layer and the seal and a second barrier layer located between the seal and a cathode side of the electrolyte the adjacent SOFC.

6. The SOFC stack of claim 1, wherein the electrically conductive metal oxide layer comprises a perovskite layer or a spinel layer.

7. The SOFC stack of claim 6, wherein the electrically conductive metal oxide layer comprises lanthanum strontium manganate (LSM), lanthanum strontium cobaltite, lanthanum strontium manganate-cobaltite, or $Mn_xCo_{3-x}O_4$ spinel, where x ranges between 1 and 2.

8. The SOFC stack of claim 1, wherein:
the stack comprises internal manifolds for fuel;
the manifolds comprise fuel riser openings in the interconnects and the SOFCs;
the stack comprises ring seals around the fuel riser openings; and
the barrier layer is located around a fuel riser opening between the seal and at least one of the metal oxide layer and the electrolyte but not over the SOFC cathode electrode.

9. The SOFC stack of claim 1, wherein the SOFCs comprises a zirconia based electrolyte and wherein the electrically conductive metal oxide layer comprises LSM.

10. The SOFC stack of claim 1, wherein the barrier layer comprises fused particles of a glass ceramic and a polycrystalline ceramic.

11. The SOFC stack of claim 10, wherein the barrier layer has an average grain or particle size of 2 microns or less.

12. The SOFC stack of claim 1, wherein the barrier layer comprises a sintered mixture of potassium feldspar and zirconium silicate.

13. The SOFC stack of claim 12, wherein the barrier layer further comprises an alkali earth silicate.

* * * * *